(12) United States Patent  (10) Patent No.: US 7,629,699 B2
Annen et al.  (45) Date of Patent: Dec. 8, 2009

(54) SYSTEM AND METHOD FOR CONTROLLING A POWER GENERATING SYSTEM

(75) Inventors: Kurt D. Annen, Rowley, MA (US); Jamie Woodroffe, North Reading, MA (US); Roger Putnam, Newton Highlands, MA (US)

(73) Assignee: Aerodyne Research, Inc., Billerica, MA (US)

( * ) Notice: Subject to any disclaimer, the term of this patent is extended or adjusted under 35 U.S.C. 154(b) by 247 days.

(21) Appl. No.: 11/619,969

(22) Filed: Jan. 4, 2007

(65) Prior Publication Data

US 2007/0158945 A1  Jul. 12, 2007

Related U.S. Application Data

(63) Continuation-in-part of application No. 11/327,732, filed on Jan. 6, 2006, now Pat. No. 7,332,825.

(51) Int. Cl.
  *H02P 9/00* (2006.01)
  *H02K 7/18* (2006.01)
(52) U.S. Cl. .................................... 290/1 A; 322/44
(58) Field of Classification Search ................ 290/1 A, 290/40 R, 40 C, 40 B; 123/46 E; 322/44
See application file for complete search history.

(56) References Cited

U.S. PATENT DOCUMENTS

| | | | |
|---|---|---|---|
| 3,247,406 A | | 4/1966 | Toesca |
| 3,398,302 A | | 8/1968 | Backstein et al |
| 3,530,366 A | * | 9/1970 | Schwarm .................. 322/28 |
| 3,675,031 A | | 7/1972 | Lavigne |
| 3,766,399 A | | 10/1973 | Demetrescu |
| 4,295,087 A | * | 10/1981 | Morishita et al. ............ 322/99 |
| 4,500,827 A | | 2/1985 | Merritt et al. |
| 4,532,431 A | | 7/1985 | Iliev et al. |

(Continued)

FOREIGN PATENT DOCUMENTS

CN  1821567  12/2005

*Primary Examiner*—Julio C. Gonzalez
(74) *Attorney, Agent, or Firm*—William A. Loginov; Loginov & Associates PLLC

(57) ABSTRACT

This invention overcomes the disadvantages of the prior art by providing a power generating system particularly suitable for field use in remote locations, which is fuel-efficient, relatively quiet, tolerant of dust, capable of operating on low-grade logistics and diesel-like fuels and capable of generating between 500 W and 2 KW of continuous electrical power. This generating system employs a two-cycle MICE generator having a piston that operates within a cylinder, and an interconnected, axially moving piston shaft that oscillates an alternator coil within a magnetic core. The piston shaft is attached to, and resisted by, the free end of a strong spring with a second, opposing end fixed to the MICE casing. To control operation of the MICE generator a clipper circuit is employed with a set threshold to resolve peaks and an adjustable harshness for applying load to the coil based upon an amps/volt harshness setting. The engine can also be controlled dynamically throughout the cycle using the added feedback from the proportional and integral elements of a PID controller in conjunction with an energy dissipating and/or storing circuit to load the coil. The dynamic control can be based on a switching power supply implementation. Various engine operating parameters can be derived from coil voltage, current and resistance, and used to control and/or monitor the engine's performance.

13 Claims, 28 Drawing Sheets

U.S. PATENT DOCUMENTS

| | | | |
|---|---|---|---|
| 4,858,576 A | 8/1989 | Jeffries et al. | |
| 5,002,020 A | 3/1991 | Kos | |
| 5,434,782 A * | 7/1995 | Henry | 701/37 |
| 5,528,445 A * | 6/1996 | Cooke et al. | 361/20 |
| 5,642,033 A * | 6/1997 | Bartol et al. | 322/25 |
| 5,687,066 A * | 11/1997 | Cook, II | 363/89 |
| 5,977,654 A * | 11/1999 | Johnson et al. | 307/10.3 |
| 6,050,092 A | 4/2000 | Genstler et al. | |
| 6,094,912 A | 8/2000 | Williford | |
| 6,349,683 B1 | 2/2002 | Annen et al. | |
| 6,479,964 B2 | 11/2002 | Woodreffe et al. | |
| 6,532,916 B2 * | 3/2003 | Kerrebrock | 123/46 E |
| 6,541,875 B1 | 4/2003 | Berlinger et al. | |
| 6,847,515 B1 * | 1/2005 | Kelley et al. | 361/160 |
| 7,005,833 B2 * | 2/2006 | Adams | 322/37 |
| 2002/0113573 A1 | 8/2002 | Woodroffe et al. | |
| 2002/0139323 A1 | 10/2002 | Kerrebrock | |
| 2003/0107349 A1 * | 6/2003 | Haydock et al. | 322/28 |
| 2004/0178774 A1 * | 9/2004 | Randall et al. | 322/23 |
| 2005/0212365 A1 | 9/2005 | Kraus et al. | |
| 2006/0119350 A1 | 6/2006 | Berchowitz et al. | |
| 2006/0238172 A1 | 10/2006 | Maehara et al. | |
| 2007/0084271 A1 | 4/2007 | Boyle et al. | |

* cited by examiner

SYSTEM AND METHOD FOR CONTROLLING A POWER GENERATING SYSTEM

RELATED APPLICATIONS

This application is a continuation-in-part of commonly owned copending U.S. patent application Ser. No. 11/372,732 entitled SYSTEM AND METHOD FOR CONTROLLING A POWER GENERATING SYSTEM filed on Jan. 6, 2006 by Kurt D. Annen, et al., which is related to U.S. patent application Ser. No. 11/326,704 POWER GENERATING SYSTEM, filed Jan. 6, 2006 by Kurt D. Annen, et al., the teachings of which is expressly incorporated herein by reference.

STATEMENT REGARDING FEDERALLY SUPPORTED RESEARCH OR DEVELOPMENT

This invention was made with government support under Small Business Innovation Research awards: H92222-05-P-0028 and DAAB15-03-C-0011. The government has certain rights in this invention.

BACKGROUND OF THE INVENTION

1. Field of the Invention

The present application relates to small portable power sources and more particularly to small combustion motor generator power sources.

2. Background Information

For over a century there has been a need to generate electric power in the field, away from a reliable source of continuous power, such as the utility grid. Remotely generated power has, and continues to be, needed to operate lighting, equipment, radios and other key devices. Standard approaches to generating or supplying remote power have centered around a few basic technologies, namely: (a) a precharged battery assembly that is sized appropriately for the load and duration, (b) a motor generator packaged that operates a dynamo or alternator sized in output that satisfies the expected load; (c) a hybrid having a motor-generator, battery assembly combination, and (d) a "Stirling" cycle generator. Each of these prior art approaches has limitations.

In the first type, the battery packs are heavy, have limited power, and short duration (in normal use, after one hour or so the battery pack needs to be removed and recharged).

For the second type, traditional fuel-powered motor-generators (Diesel or Otto cycle-type) using rotary crank shafts and pistons are heavy, noisy, and not particularly portable, and therefore impractical in many applications that require frequent movement, often on foot through rough terrain. The typical motor generator used on a field construction site may be quite large and heavy to lift. It is usually dropped in one place and connected to a device or plurality of devices by a cord, often tens of feet long. Its construction and weight do not lend themselves to frequent movement and/or placement close to the device. These prior art motor generators are large because, while the average power is not high (less than 50-200 watts), the peak power output may be many times larger while a device is actually operating.

The third type of generation approach is derived from automotive technology, where a small engine charges batteries in a "hybrid" vehicle containing the batteries and the internal combustion engine. However, such automotive-sized components (engine generator and batteries) are significantly larger than needed for most field applications (a few watts (W) to 1-2 kW) they do not scale down well. In particular, the smaller the engine, the larger the battery needed to store power, so as to ensure sufficient peak power will remain available at all times. Moreover, where a connected device is run continuously, the engine must still be sized to deliver energy that matches or exceeds the device's power demand or the battery will slowly discharge as the system falls short of the continuous demand.

A fourth type of generation approach, known as the Stirling cycle engine, while having good combustion, is potentially quiet and is tolerant to ingesting particles. However, conventional designs have a high weight to power out ratio.

An alternate approach for providing a two cycle crankless engine that integrates an alternator coil with a sprung inline piston is taught in commonly assigned and published U.S. Pat. No. 6,349,683 entitled MINIATURE GENERATOR by Kurt Annen, et al., the teachings of which are expressly incorporated herein by reference. This engine employs a strong multi-helix spring to buffer the power stroke of a piston that moves an alternator coil through a permanent magnet to generate AC power. This power is conditioned to provide the needed DC voltage for operating a power tool or similar device. A small recharging battery or capacitor can be interconnected to the alternator and device motor to provide peak output current when needed. The motor of this system is surprisingly small and light, being comparable in size to a small scale model airplane engine. It is herein termed a miniature internal combustion engine (MICE)/generator.

Such performance significantly exceeds that available from a conventional crank-case engine/generator or a charged battery array for a given weight/size. This technology lends itself to a larger scale application, such as field power generation in, for example, the 12-24-28 VAC or VDC range with power output of, for example, 500 W to 1-2 KW.

SUMMARY OF THE INVENTION

This invention overcomes the disadvantages of the prior art by providing a power generating system particularly suitable for field use in remote locations, which is fuel-efficient, relatively quiet, tolerant of dust, capable of operating on low grade logistics and diesel-like fuels and capable of generating between 500 W and 2 KW of continuous electrical power. This generating system employs a MICE generator having a piston that operates within a cylinder arranged for two-cycle operation, and an interconnected, axially moving piston shaft that oscillates an alternator coil within a magnetic core. The piston shaft is attached to, and resisted by, the free end of a strong spring with a second, opposing end fixed to the MICE casing. To control operation of the MICE generator a dual clipper circuit is operatively connected with the alternator coil. The clipper circuit senses the current and at least two voltage levels and applies at least two respective loads in response to the sensed voltage levels and current so as to (a) prevent overstroke of the piston and (b) control power output of the alternator coil. More particularly, in an illustrative embodiment the clipper circuit can include a settable threshold voltage above which clipping occurs, peaks above the threshold are subjected to a harshness circuit that applies an adjustable current/volt value whereby load on the alternator coil to counteract the peaks is increased relative to the voltage peaks based upon a predetermined level of amps. In an illustrative implementation, a MOSFET is used as a power absorption circuit. In other embodiments, a switching power supply that directs load to a storage element and/or a dissipative element is employed.

In another embodiment, the clipper circuit can be used in parallel with (or substituted by) a dynamic control circuit that acts upon the entire alternator coil waveform to more fully control peaks. The coil output is passed through a low pass filter and a correction factor in comprising an approximately triangular waveform may be applied to derive the average voltage. Average voltage overcomes the fact that the clipper circuit removes peaks. A set input voltage lowers the average to a level that fluctuates above and below 0 volts. This value is multiplied with a gain and passed to the proportional and the integral feedback elements of a proportional-integral-derivative (PID) controller. The resulting feedback values are added and the feedback is multiplied with the current from the coil, which is then provided to the gate of a MOSFET or other power circuit that dissipates or stores power from the coil. The proportional element responds quickly to changes, while the integrator ensures a stable level of runtime operation. Since startup of the engine poses unique issues for the circuit, due to the slow response of the integrator, a preset load cab be provided on a timed (or other) basis at startup to force the integrator to a predetermined startup level, thereby providing the needed load. A second preset load can be also provided at the feedback output to the multiplier to overcome the initial actions of the proportional element. These preset loads are released after startup has completed (for example, after 50-70 milliseconds), either at once, or in stages in which the preset load is gradually reduced.

An exemplary MOSFET circuit can be further stabilized herein by providing an operational amplifier that receives the feedback signal and passes this feedback through the positive input of an operational amplifier. The output is directed to the MOSFET gate. The negative terminal is tied to the dissipative source lead of the MOSFET to provide a stabilizing feedback loop at the amplifier. The negative amplifier lead voltage is divided by a factor of, for example, 4.3 in this embodiment relative to the source lead voltage. A gain block consisting of a pair of transistors is provided at the output of the amplifier to increase the sharpness of the feedback signal applied to the gate. The feedback input to the amplifier and the gain block are connected to ground via diodes to linearize the MOSFET and limit the input gate voltage to positive. In addition a resistor and capacitor bridge connects the gate lead to the dissipative lead.

Dynamic engine control can also be provided in another embodiment by a switching power supply arrangement that uses a MOSFET or other power controller as a switch to selectively draw power from the coil in response to a switching input, that can be based on the dynamic feedback signal or clipping. This causes load power to be stored in a large capacitor or battery so it is not dissipated and becomes available to the coil to deal with low voltage events when needed. Excess power can also be stored in a storage battery used to start up the engine and/or as a short-duration battery backup. The output of the capacitor/storage element can be connected to another switching power supply that supplies regulated voltage to the user. A dissipative element (variable resistor, for example) can be provided in conjunction with a smaller storage element or capacitor.

In an embodiment, a dissipative component can be adapted to continually dissipate a small amount of power, either in connection with the clipper circuit, the dynamic control circuit or both. In this manner, extra power is immediately available by removing the small excess dissipation.

This invention also provides a system and method for detecting monitoring the performance characteristics of the engine using the output of the alternator coil, so that these characteristics can be employed to control various aspects of the engine's operation, such as manifold heat, fuel intake, load on the alternator coil and other key functions. The performance information can also be displayed to a user and maintenance personnel where appropriate to alert to, and allow diagnosis of, potential problems. The monitoring system includes a processor or other circuit elements that receive the instantaneous alternator coil voltage, current and coil resistance. The resistance is used with the current to correct the voltage signal. Using a combination of voltage and current, combined with appropriate constants and predetermined curve data, the system can provide data on the engine's instantaneous speed (voltage); piston position (integral of voltage); piston pressure (derivative of voltage minus current times coil magnetic field) as a function of piston position; ignition timing (pressure jumps versus piston position); combustion cylinder leakage and quenching (non-adiabatic expansion/compression versus a predetermined curve); percent of new fuel-air in exhaust (increase in piston pressure on power stroke following a misfire cycle).

BRIEF DESCRIPTION OF THE DRAWINGS

The invention description below refers to the accompanying drawings, of which.

DETAILED DESCRIPTION OF AN ILLUSTRATIVE EMBODIMENT

A. Operating Cycle of a MICE Generator

To further illustrate the operative principles of the MICE generator of this invention, reference is first made to FIGS. 1A-1D, which illustrate the operation of a typical two-cycle engine, such as those found in a small-scale model airplane.

Figure 1A:
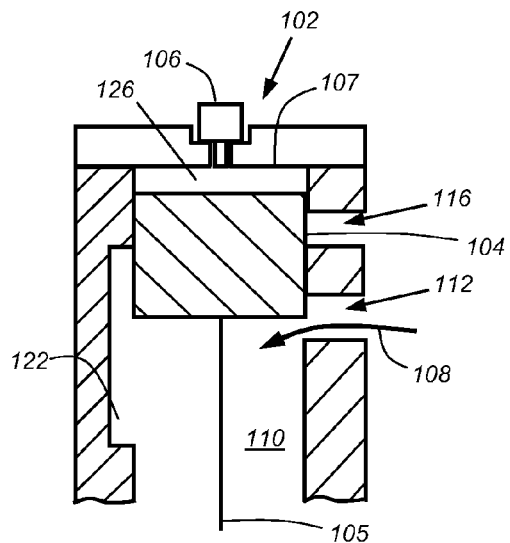
FIGS. 1A-1D are side cross sections of a cylinder head/piston of a basic two-cycle internal combustion engine.

FIG. 1A shows the cylinder head 102 of a two-cycle engine with a ringless piston 104 that drives a piston rod 105, shown at the top of its stroke. A glow plug 106 provides the ignition source during startup, and optionally during steady operation, to existing fuel/air mixture that is compressed in the space of the upper chamber 126 between the piston 104 and the top 107 of the cylinder head 102. As the piston 104 moves toward the top of the stroke, fuel-vapor/air mixture (represented by arrow 108) is contemporaneously drawn into the lower chamber 110 via an inlet port 112.

Figure 1B:
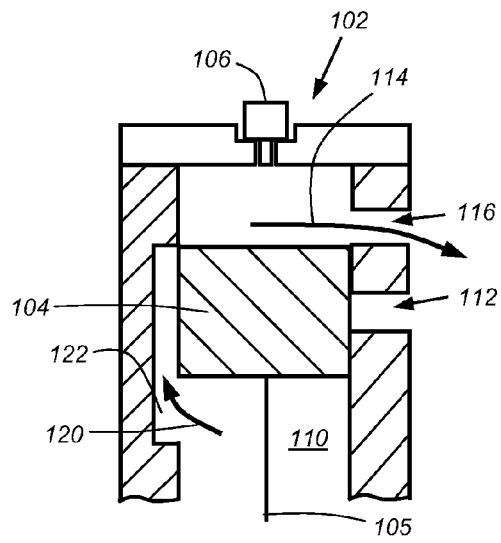

FIG. 1B shows the piston 104 after completion of the power portion of the expansion stroke that delivers power to the piston rod 105. The combustion products 114 (arrow 114) are ejected via an exhaust port 116, and the piston closes off the inlet port 112 and forces the fuel/air mixture 120 in the lower chamber 110 into a transfer port 122, formed as a slot in the cylinder sidewall. The transfer port selectively bridges the upper chamber 126 and lower chamber 110 as the piston reciprocates in the cylinder.

Figure 1C:
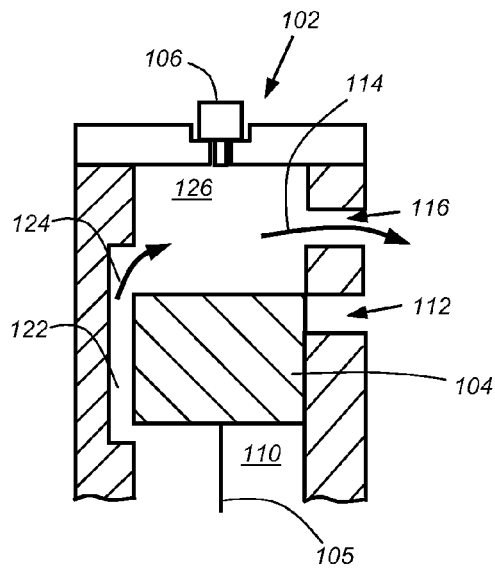

As shown in FIG. 1C, the piston 104 has moved approximately to the bottom of its stroke. As such, fuel/air mixture in the transfer port 122 enters (arrow 124) the upper cylinder chamber 126.

Figure 1D:
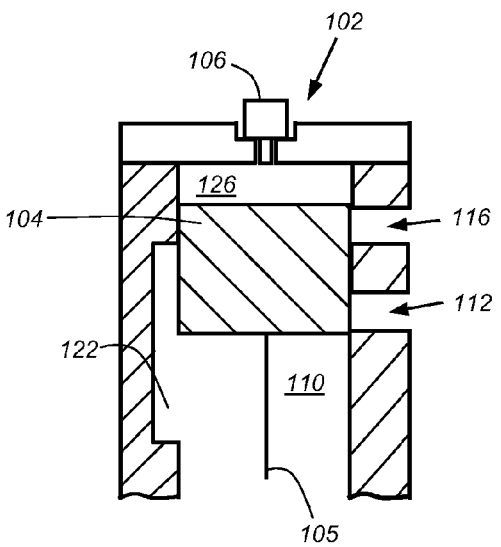

Now, referencing FIG. 1D, the piston is just beyond the point in the compression stroke at which both the exhaust port 116 and transfer port 122 are effectively closed off. The inlet port 112 is also closed at this point so that a vacuum develops in the lower chamber 110 to effect the drawing in of the fuel and air mixture when the inlet port 112 opens later in the compression stroke. At this point in the cycle, the fuel/air mixture is being compressed in the upper cylinder chamber 126, in preparation for ignition by the glow plug 106. At such time the exhaust port 116 and transfer port 122 are again closed off from the upper chamber as shown in FIG. 1A while the inlet port 112 is open to admit a new charge of fuel/air mixture.

B. General Construction of the MICE Generator

Figure 2:
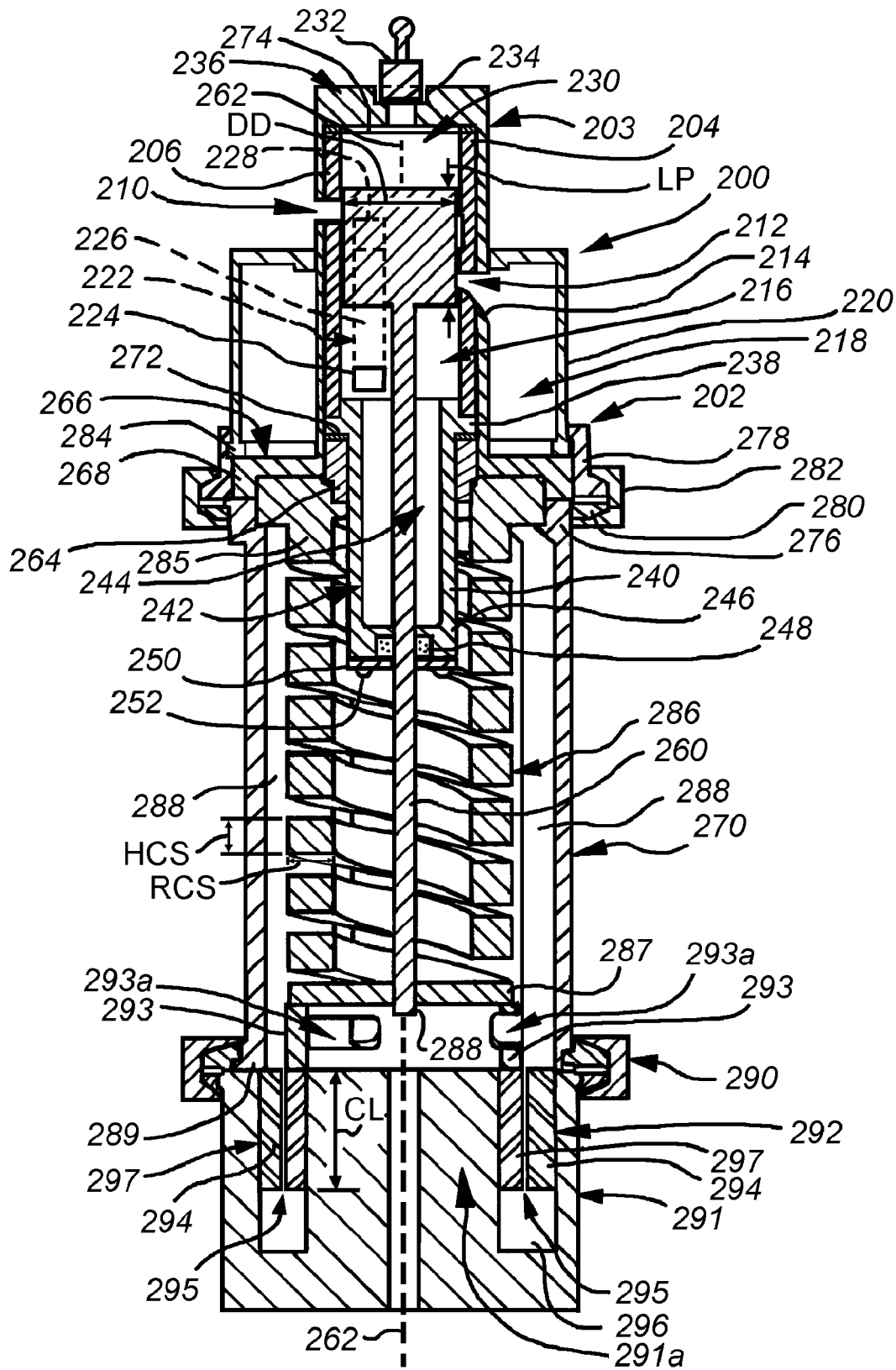
FIG. 2 is a side cross section of a miniature internal combustion engine (MICE) generator used in connection with the power generating system according to an illustrative embodiment of this invention.

Having described the basic operation of a two-cycle engine similar to the inventive MICE generator described herein, reference is now made to FIG. 2, which shows an illustrative embodiment of the MICE generator 200 for use in the electric power generation of this invention.

The upper portion 202 of the MICE generator 200 shows the cylinder head casing 203 having a geometry described in general terms for FIGS. 1A-1D. The piston 204 (constructed from 440 stainless steel alloy in this example) rides vertically/axially (as depicted) within the cylinder head casing 203, sliding within the walls of a sleeve that defines the internal cylinder 206. Notably, the piston is ringless and instead relies upon a relatively tight fit with respect to the cylinder wall to maintain compression. The cylinder 206 is constructed from steel alloy (for example, 12L14 alloy as it contains lubricating lead) in an illustrative embodiment. In an alternate embodiment, ductile cast iron can be employed, among other materials. An exhaust port 210 is defined by a cut-slot on the left side (as depicted) of the casing 203 and cylinder 206. The inlet port 212 is located on the opposing right side, vertically below the exhaust port. The inlet and exhaust ports are located opposite each other on the head to assist in balancing pressure and flow though the head during operation, which assists in preventing unwanted seizure of the piston. The inlet port 212 includes a lower wall 214 angled at approximately 30 degrees, tapering outwardly toward the exterior of the casing 203. The taper (214) assists in porting fuel/air mixture (described further below) into the lower cylinder chamber 216 via a plenum space 218, enclosed by an inlet plenum casing 220 also described below. The taper also increases the separation between the inlet and exhaust ports at the outer cylinder casing for simple inlet plenum design. The top of the inlet port 212 is located to be substantially in line with the bottom of the piston 204 when it is at the top of its stroke in this embodiment. This serves to reduce the MICE generator's "scavenging" loss (e.g. the amount of uncombusted fuel/air mixture lost prior to ignition through the exhaust port) as the piston closes the inlet port 212 earlier in the cycle and thereby reduces backflow. In the illustrative embodiment the piston head 204 has a diameter DP of approximately 25 mm and an axial length LP of approximately 27 mm. The integral piston rod had a length of approximately 150 mm. The piston 204 can also be coated with a hard-friction reducing substance such as MicroBlue (available from Material Technologies, Inc. of Rockford, Ill.), electroless nickel or TiN according to various embodiments.

As will be described in detail, the overall construction of the MICE generator enables the use of low-volatility logistics fuels, such as diesel fuel or JP-8 (Jet-A fuel without-additives) and various mixtures that include such compounds, among others. The exhaust port 210 is located above the plenum so that exhaust gas does not mix with intake fuel/air mixture. The exhaust port and/or the inlet port can include vertical ribs (not shown for clarity) that divide the port in the cylinder wall, and optionally, the casing wall, to provide a continuous surface between the piston and cylinder and reduce maximum interface loads.

The casing and cylinder walls include a transfer port structure 222. In one embodiment, an opposing, identical structure (not shown) is provided circumferentially opposite the depicted transfer port. A lower port 224 of the overall structure 222 is formed through the cylinder 206, and is open to the lower chamber 216 until the piston 204 reaches the bottom of its stroke. A channel 226 (shown in phantom) behind the cylinder 206 routes mixture to a top port 228, which is open when the piston nears the bottom of the stroke, thereby allowing fuel/air mixture to pass into the upper (combustion) chamber 230 for subsequent ignition at the top of the stroke. A catalytic glow plug 232, fitted into a threaded glow plug receptacle 234 at the top 236 of the cylinder casing 203 is provided to effect ignition on startup and optionally during steady operation.

The lower end of the cylinder 206 engages a flange 238 that encircles and extends radially from the cylindrical wall 240 of a bearing sleeve 242. The bearing sleeve 242 defines an open space 244 in communication with the bottom chamber 216 of the cylinder 206. This space 244 is sealed at the bottom by a base wall 246 of the sleeve 242. The lower side of the base wall 246 includes a recess that carries a piston rod bearing insert 248. The sleeve is of aluminum preferably with an insert (not shown) made from Vespel® polyimide (trademark owned by DuPont) or other like bearing material known in the art. In an embodiment, the insert 248 is secured into the recess by a cover plate 250 that can be fastened to the base wall 246 using rivets, screws or similar fasteners (252), disposed around the circumference of the plate at various locations.

The insert 248 defines a gas seal against the piston rod 260. This rod 260 extends vertically along a central axis 262 of the MICE generator. The rod 260 thereby transmits the axially directed, linear force of the piston 204, derived from a combustion-generated expansion stroke, to the spring assembly and alternator assembly (described below). The rod 260 also transmits the axially-directed, linear force of the spring to the piston head on the compression stroke. In an illustrative embodiment, the piston rod 260 is constructed from hard steel and is rigidly attached to the piston. The rod 260 is either a unitary member, formed simultaneously with the piston 204, or a separate component that is welded, threaded or press-fit into the piston 204. Alignment of the rod 260 along the axis 262 is significant. In an embodiment in which the rod 260 is rigidly attached to the piston and, itself, rigid, any misalignment will cause the piston to skew in the cylinder, thereby generating friction and excessive wear between the piston and cylinder wall. Likewise, because the clearance between the coil and the magnet of the alternator assembly (described below) is very small, unwanted transverse movement will produce contact causing friction and possible damage to these components.

In an alternate embodiment, minor misalignment of the rod with respect to the axis 262 can be tolerated where the rod is somewhat flexible, or connected to the piston using a flexible and/or joint that displaces radially (e.g. on a plane perpendicular to the axis 262).

The space 244 defined by the bearing sleeve 242 is adapted to provide improved scavenging of fuel/air mixture during operation by appending volume to the lower chamber 216 and effectively defining a "scavenging chamber" in which additional volume for retaining fuel/air mixture without loss through the exhaust is provided. The additional volume also reduces the parasitic scavenging compression work, and can be sized to improve the pressure tuning of the inlet processes. The scavenging ratio achieved in an operative version of the MICE generator is in the range of approximately 75-80% using JP-8 or similar fuel.

It is noted that the scavenging ratio achievable by the MICE generator is limited by the backflow that occurs through the inlet and transfer ports prior to their closing. This backflow could be reduced or eliminated by use of reed or flapper valves (not shown) that close the port when the flow is reversed. Reed valves could be used more effectively on the inlet port given their size and shape. Alternatively, a fluid diode can be employed within the transfer port to reduce backflow. The use of such valves/diodes should be balances against any inherent pressure loss that they introduce to the system.

The cylinder casing 203 engages a threaded insert 264 within its lower end 266. The lower end 266 includes a radially extended flange 268 that provides a base for the plenum casing 220, and also to provide a confronting attachment surface for the top of the spring casing 270 as described below. The inner surface of the extended flange 268 is precisely machined to have a close fit to the spring outer flange 285 to ensure close alignment of the central axes of the cylinder 206, the bearing sleeve 242 and insert 248, and the multiple helix spring 286. The top of the threaded insert 264 bears against a thin, rigid spring material 272. This spring 272 engages the bottom of the bearing sleeve flange 238, the top of which flange engages the cylinder 206. The spring 272 exerts an upward axial force on the cylinder, driving it (relative to the casing 203) against a copper gasket (approximately 10 mils thick) 274 located between the casing top 236 and the cylinder top 236. In this manner, the spring ensures 272 that the cylinder 206 remains positively sealed against both the bearing sleeve 242 and the top of the cylinder casing, thereby preventing loss of compression.

The cylinder head casing flange 268 is fixed securely to the underlying spring housing at a confronting spring housing flange 276 employing a multi-section split ring clamp assembly 278, 280 and 282. A variety of structures can be employed in alternate embodiments. Notably, the clamp assembly includes an upper clamp ring 278 that also engages a base ring 284 of the plenum casing 220; a lower clamp ring 280, that engages the exterior of the spring housing flange 276; and an external split ring 282 that rides on ramps formed in each ring 278, 280 to translate inwardly directed radial force into axial compression within the rings 278, 280. The inwardly directed radial force can be provided to the split ring by an overriding hose clamp or similar hoop-stress-generating mechanism (not shown). This clamping arrangement provides a highly secure, removable and rigid interconnection between the cylinder casing 203 and the spring housing that is free of play in either the axial or radial direction.

In this embodiment, the clamping arrangement also engages the radially extended shoulder of the top fixed end 285 of a multi-helix compression spring 286. The spring 286 compresses axially. In this embodiment, at least two opposing helices (see also FIG. 3) are formed in the spring structure so as to balance the torque produced in each helix, thereby avoiding transverse movement of the bottom of the spring causing misalignment and piston/cylinder scoring or seizing. In this embodiment, the opposing helices are formed by machining the structure from a unitary piece of titanium alloy rod. Titanium-6Al-4V alloy having excellent fatigue strength is employed in this example. The size and shape of the spring are set based upon a safety factor of 1.4 or greater based upon the maximum force produced at the extremes of the spring movement as determined by the MICE generator design stroke. Each helix includes three- and one-half turns in this embodiment. The spring is at rest with the piston located approximately one-half stroke above the bottom of the exhaust port, as shown.

Figure 3:
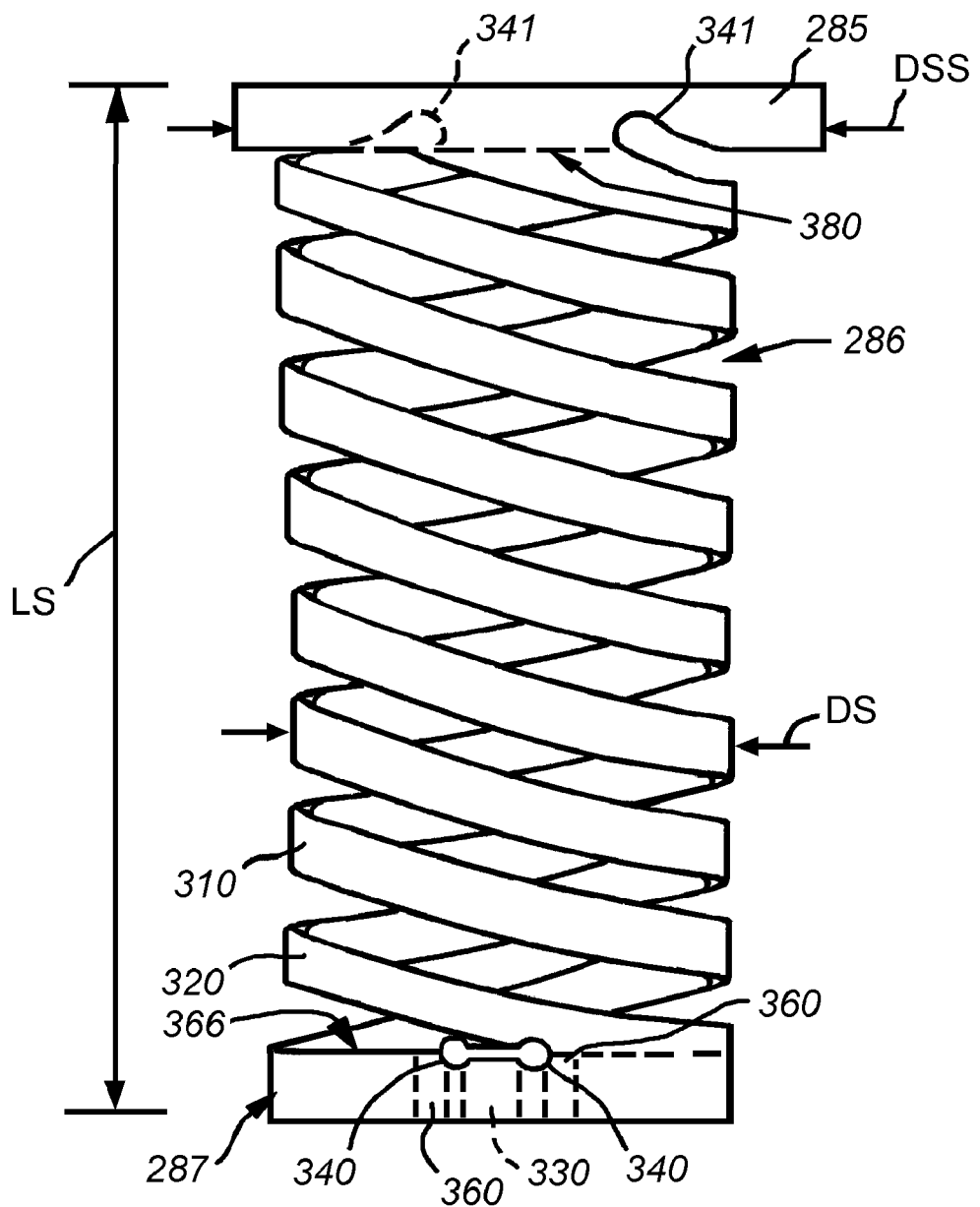
FIG. 3 is a side view of a double-helix spring for use with the MICE generator according to the embodiment of FIG. 2 detailing rounded stress reliefs formed at the joints between the helix ends and the respective top and bottom spring ends.

With reference to FIG. 3, a side view of the machined double helix spring 286 according to an illustrative embodiment is shown. In this illustrative embodiment, the diameter DS of the compressible portion of the spring 286 is about 5.4 centimeters and the top end shoulder 285 has a larger diameter DSS about 6.4 centimeters. The total length LS of the spring 286 including the shoulder 280 at the unitary top end and the unitary bottom end 284 is about 11.7 centimeters. The pitch of each helices 310, 320, in a preferred embodiment, is about 2.54 centimeters. Each helix 310, 320 includes a rectangular (rather than circular) cross section (refer to FIG. 2). This cross section, in an illustrative embodiment includes a vertical dimension HCS of approximately 0.75 centimeters and a radial/horizontal dimension RCS of approximately 0.75 centimeters. The unitary bottom end piece 287 is arranged with a precisely bored hole 330 (shown in phantom) that matches a closely-fitting portion of the piston rod (288) below a shoulder in the piston rod (260). A threaded end to the piston rod below the closely-fitting portion (288) accepts a threaded nut to secure the piston rod in the spring bottom end piece (287) between the shoulder and the nut. A variety of other attachment mechanisms for securing the bottom end of the spring to the piston rod can be employed in alternate embodiments.

While the spring 286 of this embodiment is machined from a single piece of a titanium alloy, it is expressly contemplated that the spring may be formed by other methods as one piece or as a plurality of pieces. Forming the spring 286 as a one-piece, unitary structure has an advantage in that the dimensions and shape can be precisely controlled as compared to plastically deforming a wire or piece of rod to attain the final shape. Moreover, the cross section form of a machined helix can be square, rectangular or some other shape (e.g. regular or irregular polygon, ellipse, etc.) that advantageously resists transverse motion and so better maintains alignment. Moreover, the dimensions of the spring can be controlled so that the mechanical parameters defining the spring can be well-controlled. Those parameters include, but are not limited to, the spring constant (force-per-unit-displacement), number of helices, the oscillating frequency, the mass, the Q (the ratio of stored energy to extracted energy per cycle), stresses, strains, etc. In this embodiment, the spring is set to allow oscillation of the piston/rod at approximately 110 Hz having a spring constant of 135 N/mm and a nominal power output of 340 W. The spring in an illustrative embodiment having greater power output of 500 W has a spring constant K of approximately 407 N/mm, providing a resonant frequency for the MICE generator of approximately 163 Hz. This results in an average piston speed of approximately 1600 ft/min.

It should be clear that the function of the spring is to store energy produced by the downforce of the piston after each ignition cycle, and to provide a return upward force for the compression stroke, while at the same time energy is extracted by the MICE alternator over the entire cycle. The cycle frequency, and hence the power output, of the MICE generator is determined by the spring constant. The spring has sufficient energy storage capacity to prevent the spring and attached components from "bottoming out" due to an imbalance of power output from the two-stroke engine and energy extraction by the alternator for a number of cycles. The spring of this embodiment has exhibited good spring characteristics up to and beyond its maximum design displacement. A total stroke of approximately 2.5 centimeters (or more) can be achieved in its present embodiment.

It has been observed that the points of maximum stress occur where the helices join at the pitch angle to the respective top (fixed) and bottom (free) ends 285 and 287 of the spring 286. In order to reduce the risk of stress or fatigue-related failure of the spring 286 at these points of stress concentration, each free-end and fixed-end junction includes a milled (or otherwise cut-out using, for example a sinker EDM) rounded "stress-relief" 340 and 341, respectively. The size of the stress relief is highly variable. In general, it is centered in the joint approximately between the helix end and the horizontal end piece as shown so that it extends both above and below the joint region. In this manner, as the end of the helix flexes under compression (and extension) with respect to the end piece, the curved joint defined by the stress reliefs 340 and 341 are free of a small-radius corner that produces high local stresses that may serve as a location for crack initiation and subsequent propagation to produce a fracture. The diameter of the stress relief 340 is highly variable. In one embodiment it is between approximately 1 and 4 millimeters in radius.

Figure 3A:
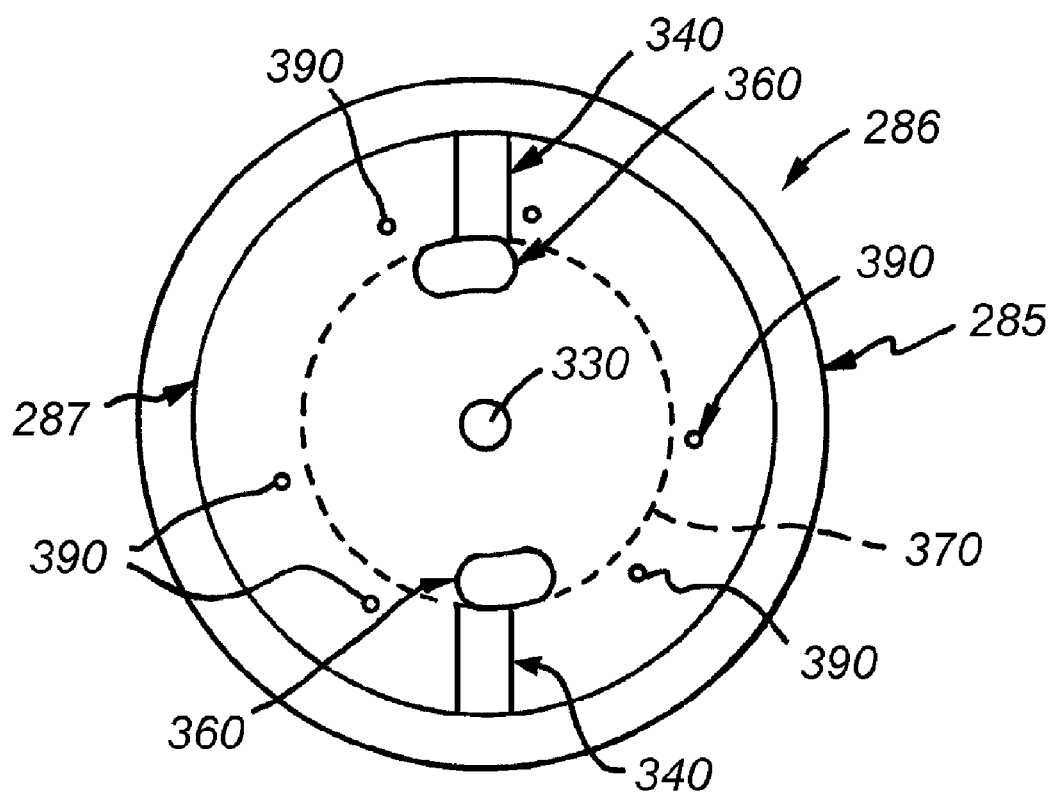
FIG. 3A is a bottom end view of the spring of FIG. 3 detailing internal stress reliefs on the free end base.

As shown in FIG. 3, the free/bottom end stress reliefs 340 are defined by rounded cuts at each helix junction. They are aligned with vertical cutouts 360 (shown in phantom) located inboard on the bottom end as shown in FIG. 3A. These vertical cutouts 360 further reduce stress concentrations where each stress relief 340 extends into the planar inner face 366 (shown partially in phantom) of the bottom 287 by allowing the relief to extend radially into the cutout (e.g. a fall-off) rather than simply stopping on the bottom face at given radial distance as a corner. The radial-outward edge of each cutout is aligned with the inner edge 370 (shown in phantom) of the helix structure.

The upper/fixed end stress reliefs 341 define curving milled slots, as shown, that extend into the fixed end base 285 at an angle slightly greater that the helix angle with respect to the plane of the inner base surface 380 (shown partially in phantom). The slots extend radially inward a width that is equal to or slightly greater that the inner edge (370) of the helix structure. This helps to ensure that the helix junction is free of concentrated stress in the with respect to the face 380.

The spring 286, piston rod 260 and bottom end 287 ride axially within the spring casing 270, which is constructed from machined aluminum alloy having a wall thickness of approximately 4 to 8 millimeters (highly variable). The top end of the casing 270 includes the flange 276 described above that engages the spring top flange 285, which is also closely engaged by the cylinder casing extended flange 268 and thus produces the alignment between the spring casing 270 and the cylinder casing 203. The spring casing 270 in this embodiment is a semi-open construction with three ports (refer to FIG. 4) divided by solid columns 288 along its mid-section. This semi-open arrangement reduces weight and is generally optional and/or subject to significant design variation according to alternate embodiments.

The lower end of the spring casing 270 includes a flange 289 that engages a clamping assembly 290 that functions similar to the assembly 278, 280 and 282 described above. This clamping assembly 290 axially and radially secures the alternator coil magnet casing 291 to the bottom of the spring casing 270. The alternator coil 292 in an illustrative embodiment is attached via a cylindrical (or part cylinder) standoff or standoffs 293 to the bottom end 287 of the spring 285. The standoff assembly 293 is secured to the spring bottom 287 using a plurality of threaded pins (not shown) that extend downwardly into respective holes in the standoff, and are secured into the standoff holes using epoxy or another strong, durable adhesive. See FIG. 3A for an illustration of threaded holes 390 in the bottom end 287 of the spring 286. The length of the standoff ensures that the spring bottom 287 does not bottom out on the inner magnet pole 291a at maximum piston downstroke. In this embodiment, the standoff includes circumferential cutouts 293a that serve to prevent resistive air compression against the inner magnet pole 291a, vent air around the assembly to cool the structure, and generally reduce heating of the assembly.

The coil 292 extends axially from the standoff assembly 293 into the air gap 295 of a fixed magnet assembly 294. The air gap 295 measures approximately 0.20 inch (radially between the inner magnet surface and the inner magnet pole 291a). This air gap 295 includes a clearance of approximately 0.015 inch between the coil and inner magnet pole 291a, and between the coil and magnet assembly 294, in an illustrative embodiment. The magnet assembly 294 resides in cylindrical well 296 formed in the casing 291. The well has a depth, beyond the magnet assembly 294, which is sufficient to allow the coil to drive axially downwardly in response to the maximum piston downstroke without striking the bottom of the well 296. The magnet assembly 294 in according to this invention can be arranged in a wide variety of ways. In an illustrative embodiment, the magnet assembly 294 consists of a plurality of individual magnets that define segments of a cylinder that encircles the outer (radially) wall 297 of the well 296, with poles directed axially with the resulting the magnetic field directed radially toward the axis 262 and therefore through the air gap 295. Thus, the individual windings of the coil—which is circumferentially-wound with the coil windings being substantially coaxial with the axis 262 and embedded in epoxy—pass substantially normal to the field direction. This orientation of the field to the windings maximizes the electromotive force generated by coil movement. The winding employs 25 AWG wire in one embodiment, composed of a total of 400 windings over a coil Length CL (FIG. 2) of 25 mm. In this embodiment, the coil is approximately the same axial length as the magnet assembly. The magnets (294) and magnet poles (291, 291a) can be constructed from a variety of materials. In an illustrative embodiment the magnets 294 are constructed from high-flux permanent magnetic material, including, but not limited to, samarium-cobalt or neodymium-iron-boron. The magnet poles are constructed from soft magnetic material such as HIPERCO® 50A or electrical iron.

Alternatively, a coil of increased length could be attached directly to the spring without use of a standoff. The operation is that as the piston 204 reciprocates the coil 292 follows, breaking the magnetic flux lines in the air gap 295 and thereby generating electrical energy from the mechanical motion.

Note that it is expressly contemplated, according to alternate embodiments, that the coil can reside in a well or other stationary structure and that the magnets can be mounted to move axially in response to the piston's reciprocation. The term alternator or alternator assembly, as used herein should be taken to include any mechanism that generates electrical power by causing one generating element to move axially under power of the piston with respect to the other generating element.

At least one of the leads (not shown) from the coil 292 is (are) insulated from the other conductive materials in the assembly. The lead or leads can be routed in any acceptable manner to exit the MICE generator structure. Care should be taken to avoid possible failure of leads due to stretching or cyclic loading. In one arrangement at least one lead is directed along a spring helix and through the ports in the spring casing near the top end 284. Where two electrically isolated leads are employed, each lead can be directed along a separate helix. Since the wire diameter will be much less than the cross-section of the helices, the wire and adhesive are highly compliant and therefore have minimal effect on the spring motion. In another illustrative implementation, one lead is formed by the MICE generator structure itself, which is electrically connected to one side of the coil thereby creating a ground contact to which the power conditioning circuitry is connected along with the other, electrically isolated lead.

Figure 4:
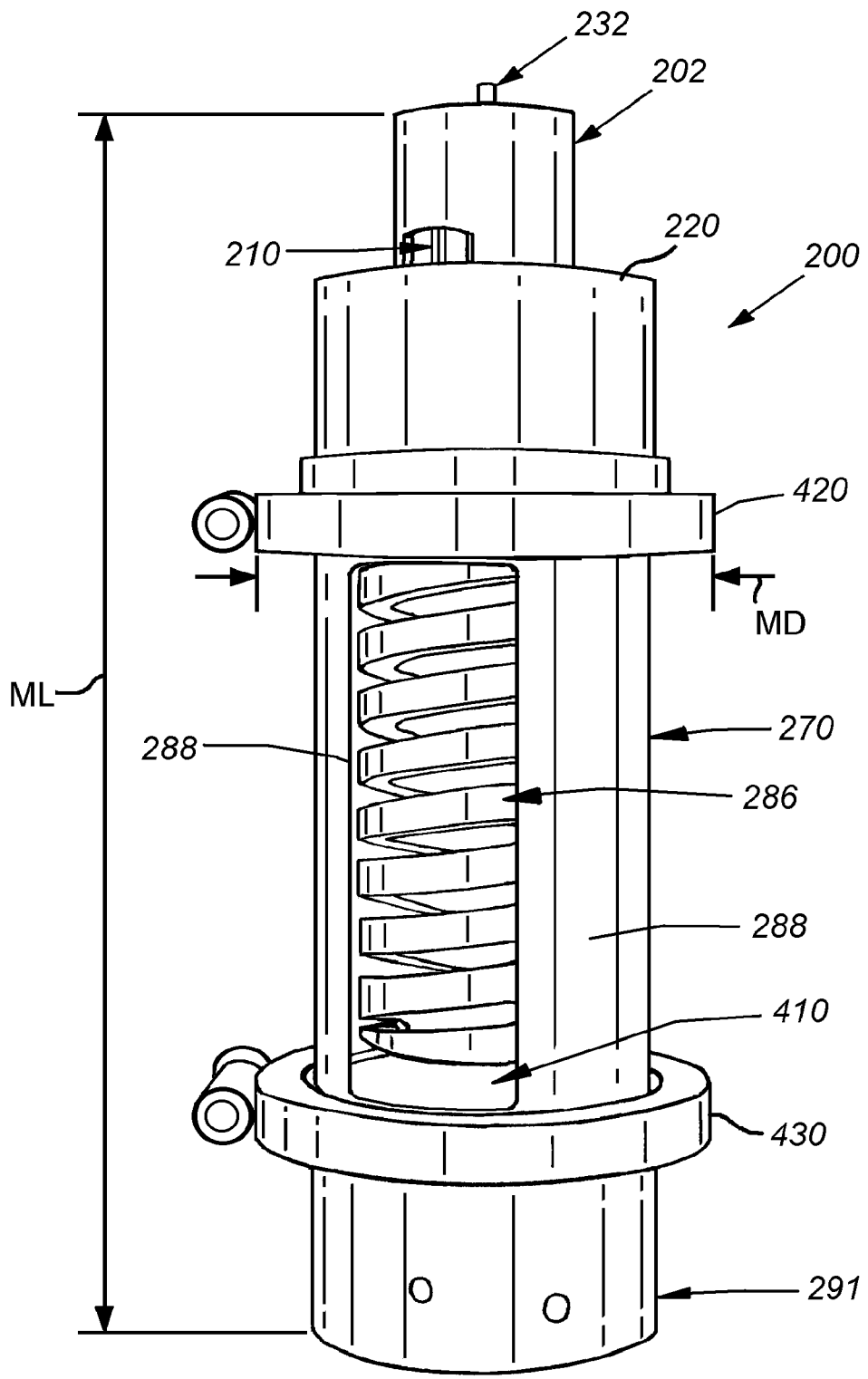
FIG. 4 is an external perspective view of the MICE generator of FIG. 2.

FIG. 4 details an external view of the MICE generator 200 according to an illustrative embodiment, as described with reference to FIG. 2. The ports 410 between columns 288 on the spring casing are more clearly visible. The spring 286 is exposed therethrough. In an illustrative embodiment, the overall length/height ML of the MICE generator without attachments (described below) is approximately 27 centimeters, and the maximum diameter MD in the region of the clamps 420 and 430 is approximately 8 centimeters. The weight of the MICE generator unit is approximately 2.7 kg with Hiperco magnet poles, and 3.1 kg with electrical iron magnet poles.

C. MICE Generator Cooling System

The MICE generator of this embodiment is designed with a relatively tight tolerance between the piston 204 and the wall of the cylinder 206. The cylinder and piston can be expected to undergo thermal expansion and contraction within a predetermined range as the MICE generator transitions from a cooler ambient temperature at cold-startup to a normal operating temperature (several hundred degrees hotter, for example). By reliably regulating the temperature of the cylinder head during steady state operation, the effects of thermal expansion can be moderated and, more particularly, the piston and cylinder can be sized to optimize their relative fit at this desired steady state temperature. In other words, where an unregulated operating temperature may cause excessive expansion of the cylinder relative to the piston, a more-regulated (lower) operating temperature may reduce relative expansion and maintain it at a desired range. Significantly this range can be set to allow the buildup (without scraping-off) of a combustion-generated carbon black (graphite) layer on the piston and cylinder that both seals the upper chamber 230 and effectively lubricates the surfaces as they slide against each other. In this manner it is contemplated that the piston (also having the above-described hard coating, smooth coating applied thereto) is essentially self-lubricating without need of a separate lubrication oil source.

Figure 5:
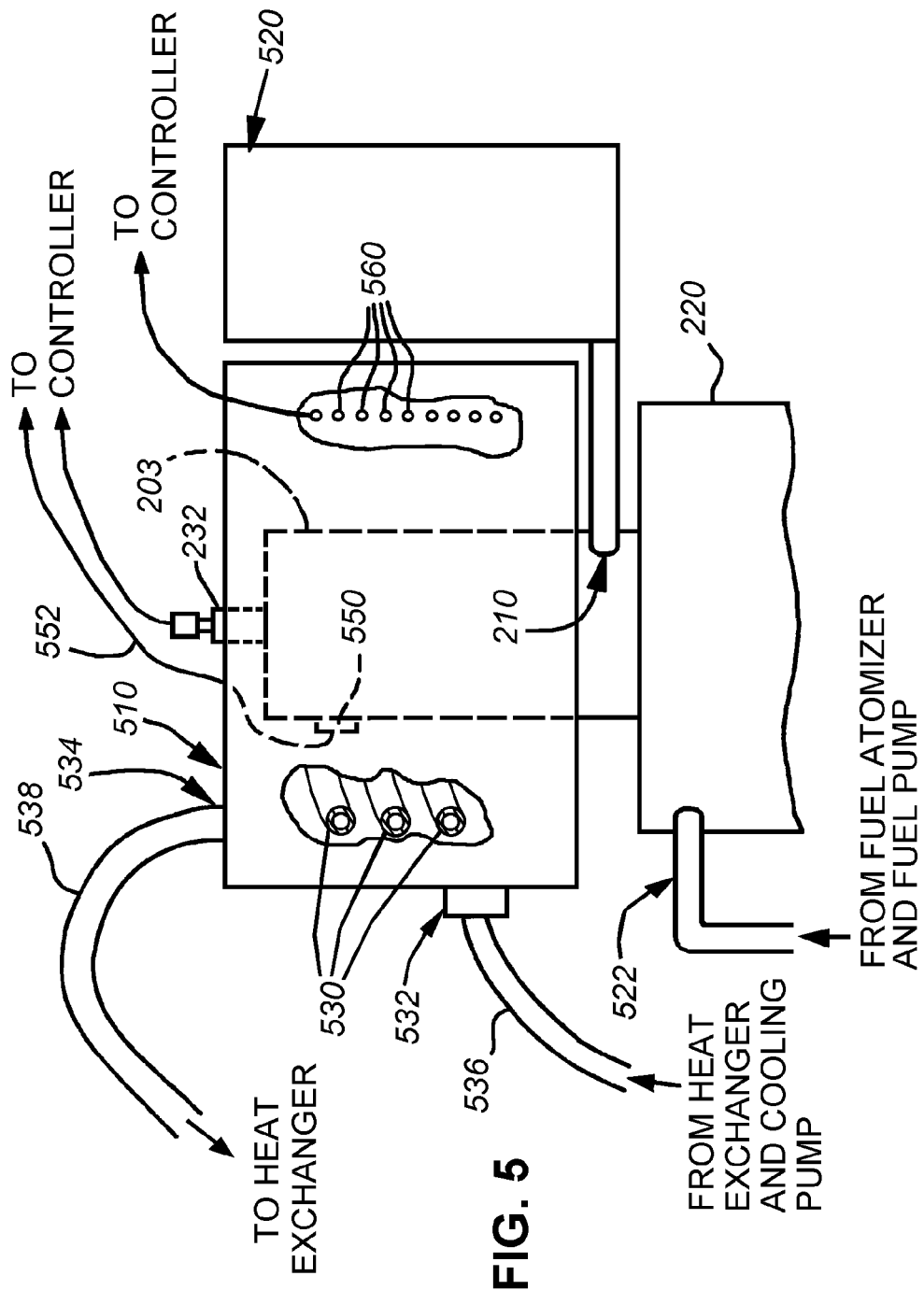
FIG. 5 is a partial exposed side view of a cooling head mounted over the cylinder head casing of the MICE generator of FIG. 2.

FIG. 5 details a basic cooling arrangement according to an embodiment of the invention. The cylinder head casing 203 is surrounded by a metal cooling head 510 that encloses the casing 203 above the exhaust port 210. A simplified muffler 520, similar to that found on a lawn and garden tool motor is attached to the port using bolts, straps or any acceptable arrangement. The inlet plenum 220 and an interconnected line 522 that delivers atomized fuel air mixture from an ultrasonic atomizer and fuel pump (described below) are positioned below the exhaust port 210.

The cooling head 510 is constructed from a thermally conductive metal, such as aluminum alloy. It includes internal tubing or channels 530 (shown in cutaway) that encircle the head and pass a stream of pump-driven cooling fluid (water or another fluid/mixture) from and inlet 532 to an outlet 534. As the fluid moves through the head 510, it conducts heat, generated by combustion away from the head casing. The inlet 532 and outlet 534 are connected via respective tubing 536 and 538 to a conventional heat exchanger (not shown in FIG. 5) that transfers the cylinder head heat to, for example, an airflow-driven by a fan. The heat exchanger can reject waste heat in a variety of ways as described further below. A coolant reservoir (not shown) with a capacity of approximately 100 ml can also be provided in line with the cooling circuit described herein.

A temperature sensor 550 (shown in phantom) is provided at one or more convenient locations on the casing 203, or another interconnected component that provide an accurate temperature reading. The sensor 550 is interconnected by a line to a controller (not shown in FIG. 5) that regulates heat exchange, thereby allowing the head to operate within a relatively narrow range of temperatures at steady state. The pump and/or heat exchanger is controlled to regulate the amount of rejected heat, either by regulating the speed of the coolant pump of or the amount of airflow passing over the heat exchanger.

Figure 6:
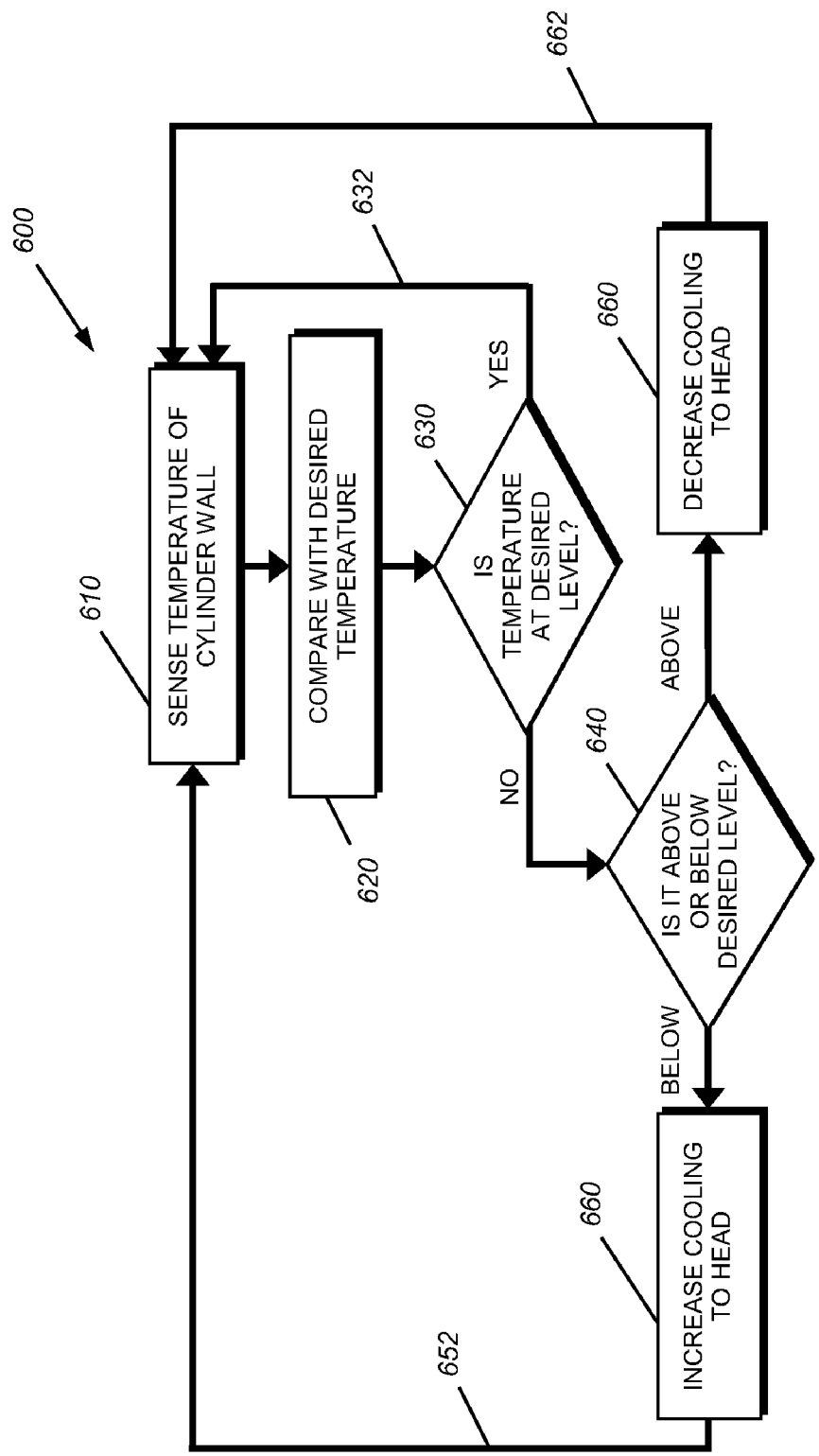
FIG. 6 is a flow diagram describing a procedure for regulating cooling based upon sensed temperature at the head of the MICE generator.

A basic control procedure 600 is detailed in the flow diagram of FIG. 6. The procedure continually senses the temperature of the cylinder wall or an associated component (step 610). The sensed temperature is compared to a desired operating temperature (step 620). This can be a range of temperatures and/or can be dependent upon that particular timing of the sensing step. For example, the system may have one or more lower desired temperatures at an early time after startup. Similarly, the desired temperature may differ at differing power output levels. A variation of this concept is described further below. The controller decides if the sensed temperature is within the desired temperature range (decision step 630). If the temperature is within the desired range, then the procedure 600 continues to monitor the temperature (branch 632 to step 610).

If the temperature is not within the desired range (branch 634 to decision step 640), and the temperature is above, the desired range, the controller increases cooling at the cooling head 510 (step 650, and continues to monitor (branch 652 to step 610). The increase in cooling can entail increasing cooling fluid pump speed/flow rate and/or increasing heat exchange at the heat exchanger.

Likewise, if the temperature is below the desired range (decision step 640), the procedure calls for a decrease in cooling (step 660) by either decreasing pump speed/flow rate and/or decreasing heat exchange. The procedure continues to monitor temperature thereafter (branch 662 to step 610).

The parameters of size, shape, volume and casing-coverage of the cooling head 510 are all highly variable. In general, the cooling head should be sized sufficiently to allow maintenance of a desired temperature for a given power output by the MICE generator. In this manner, the relative fit of the piston and head can be better maintained.

Figure 7:
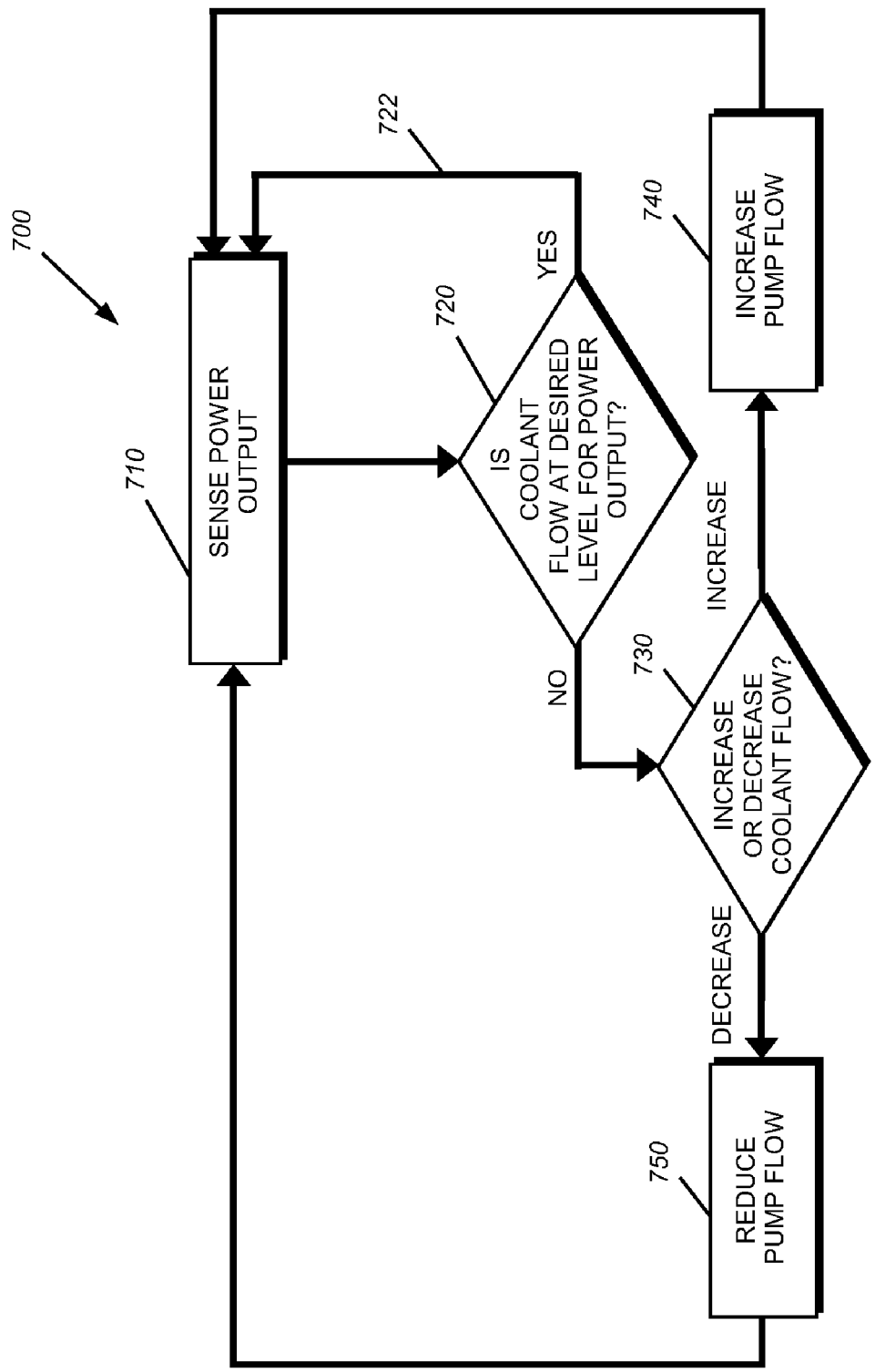
FIG. 7 is a flow diagram describing a procedure for regulating cooling based upon sensed power output from the MICE generator.

While sensing temperature at the cylinder head casing 203 is an effective, direct technique for determining current operating temperature, and thereby regulating cooling, an alternate or supplementary procedure 700 for controlling cooling is described in FIG. 7. Since the MICE generator generally operates at a higher power level when at steady state and/or under load from current draw, the amount of heat generated by the head tends to increase accordingly at higher output levels. To this end, the controller can sense the prevailing output level at the output of the alternator or within the power circuitry (step 710). The procedure 700 determines (via decision step 720) whether the prevailing coolant flow or pump speed is at a desired level for the given sensed power output. If the coolant flow is at the desired level, then the procedure continues to monitor power output (branch 722 to step 710). If the coolant flow is not at the desired level for a given power output, then (via decision step 730) the procedure either increases pump flow where more power call for more cooling (step 740) or decreases coolant flow (step 750) where lower power output calls for less cooling. The level of heat exchange at the heat exchanger can also be regulated according to alternate embodiments.

It is contemplated that attaining appropriate head casing temperature can be desirable prior to startup. This occurs in part through the energizing of the glow plug 232 by the controller. The heat generated by the glow plug causes the upper chamber 230 to heat, and also transmits heat to the surrounding casing. However, significantly greater heating of the casing to a temperature closer to the desired operating temperature can be achieved by providing a supplementary electrical resistance heater (wires 560, shown in cutaway) to the cooling head 510, that operates prior to and during startup to quickly heat the casing 203 to a temperature that brings the piston and casing closer to their final thermally expanded sizes. Alternatively, an electrical resistance heating assembly (for example, a nichrome wire coil) can be provided in line with the heat exchanger so as to heat the liquid stream to thereby heat the cooling head 510 and attached casing 203. Appropriate controller programming can be provided to activate the resistance heating assembly during a startup sequence and thereafter deactivate this "block heater" when a predetermined temperature and/or power output is attained.

D. Control of Air/Fuel Temperature at MICE Generator Intake Plenum

Figure 8:
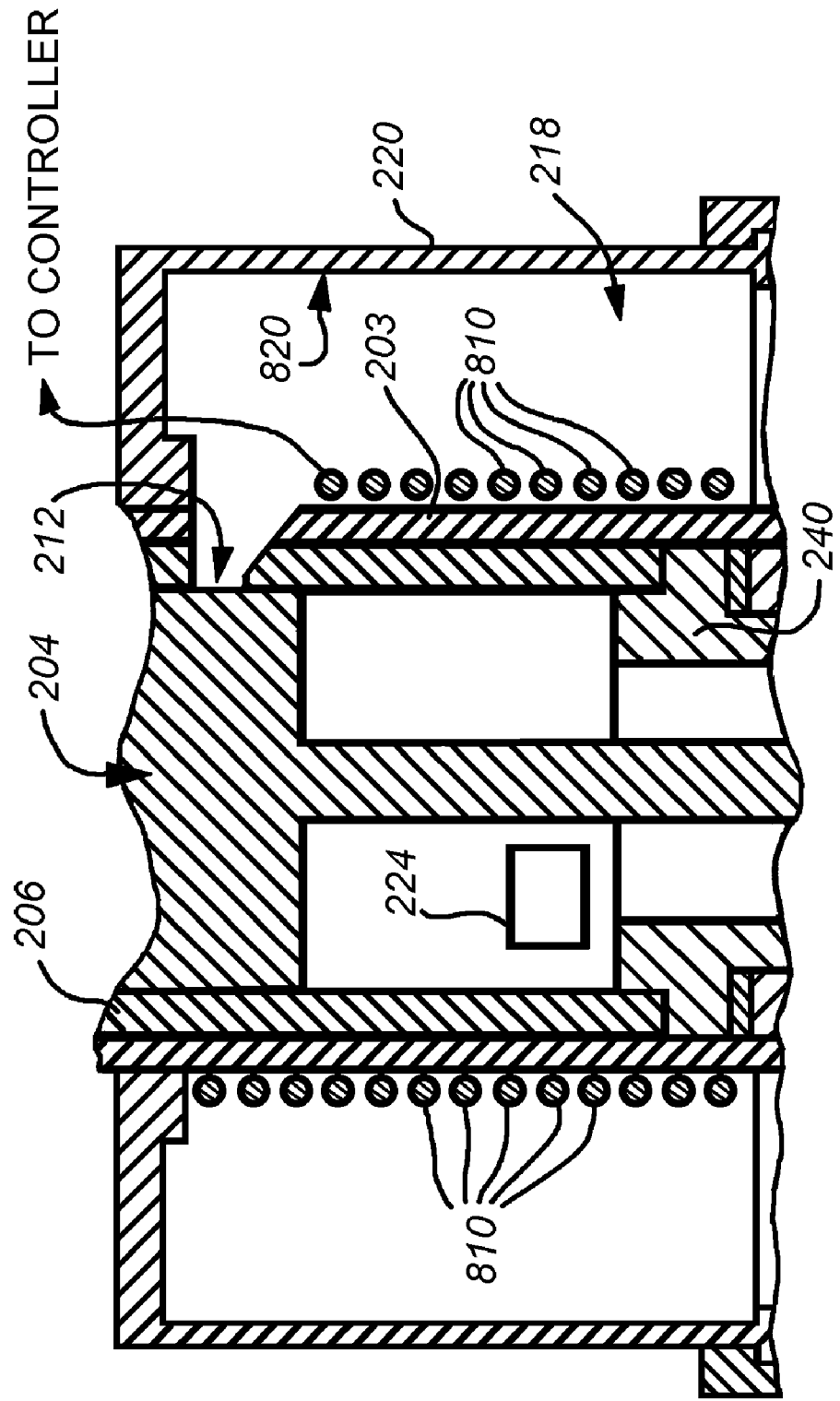
FIG. 8 is a partial side cross section of the MICE generator in the area of the intake plenum detailing a plenum heater according to an illustrative embodiment.

It is recognized that use of low-volatility fuels, such as JP-8, typically requires a significant degree of atomization to achieve adequate combustion at ambient (or slightly elevated) inlet temperature. The fuel system avoids the use of costly and complex fuel injection components by providing a sealed plenum 220 that defines a vaporization space around the intake port 212. As shown in FIG. 5, the plenum 220 is supplied by an enlarged diameter hose or tube 522 that carries a mixture of fuel and air from an atomizer. A conventional ultrasonic atomizer that receives fuel from a source via a pump, and mixes the fuel with air from an intake, is provided (see below). The input fuel mixture is dispersed into small liquid droplets when it reaches the chamber of the plenum whereupon it evaporates at the elevated temperature and residence time provided by the inlet plenum. It is then drawn through the intake port 212 to eventually rise into the upper combustion chamber 230, via the transfer port 222. To ensure volatility of the mixture, particularly at startup, the plenum can be heated. FIG. 8 shows an internal plenum heater composed of a coil of electrical resistance wires 810 that are wrapped directly around the head casing 203 in the interior space of the plenum. This arrangement advantageously heats the head simultaneously to elevate the head temperature prior to startup. Alternatively (or additionally), wires can be provided to the outer wall 820 and/or another location on the plenum or within the plenum space 218.

Figure 9:
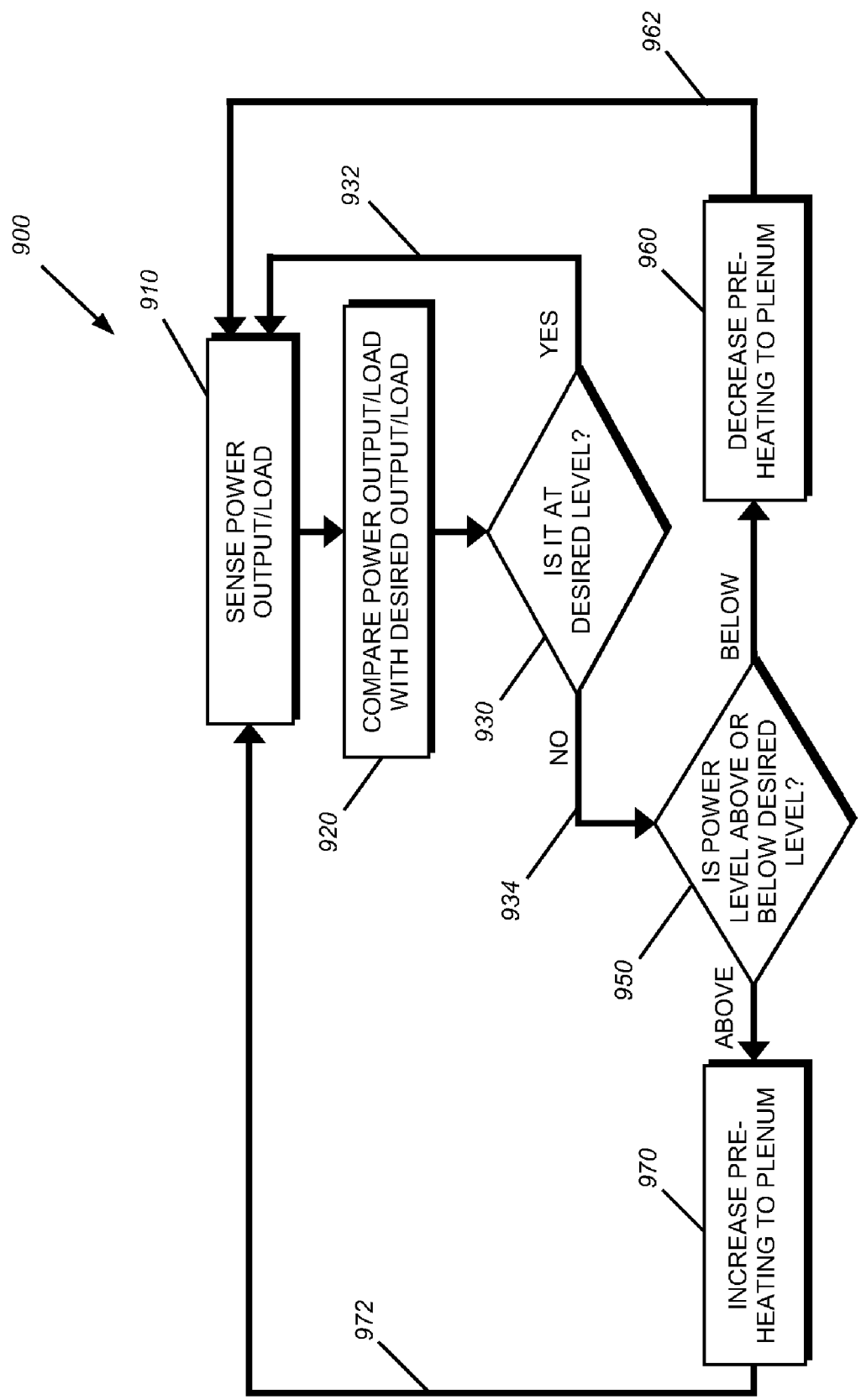
FIG. 9 is a flow diagram describing a procedure for controlling output based upon plenum heating.

In general, the heating of the plenum space 218 is controlled by the controller and occurs at least until a sufficient time after startup has elapsed, the head temperature has attained a predetermined level and/or the power output has achieved a certain level. In some embodiments, plenum heating occurs continuously at some level throughout operation to ensure appropriate fuel/air volatility. In fact, control of plenum heating (or heating of another portion of the fuel-delivery system) can be employed to regulate power output by controlling the inlet charge density. FIG. 9 describes a procedure 900 for controlling power output using plenum heating. The controller senses the state of power output and/or load (step 910) and compares this value with the needed power output or load (step 920). If power is at the desired level (decision step 930), then the system continues to sense and compare (steps 910 and 920 via branch 932). Conversely, if there is an imbalance between needed output and existing output (decision step 940 via branch 934), then the controller determines whether the present output is above or below the need. If the power output is above the need, then plenum heating is increased (step 970) to reduce the density of fuel/air and thus the mass flow rate of reactants delivered to the two-stroke engine, and the controller continues to sense and compare (steps 910 and 920 via branch 962). Conversely, if power output is below the need, then the plenum heating is reduced (step 960) to increase the density of fuel/air, thus increasing the mass flow rate of reactants to the two-stroke engine. This control scheme presupposes that at all times the level of air preheat is sufficient to vaporize the fuel droplets prior to the completion of the compression stroke to permit efficient combustion. The controller then continues to sense and compare (steps 910 and 920 via branch 972).

Figure 10:
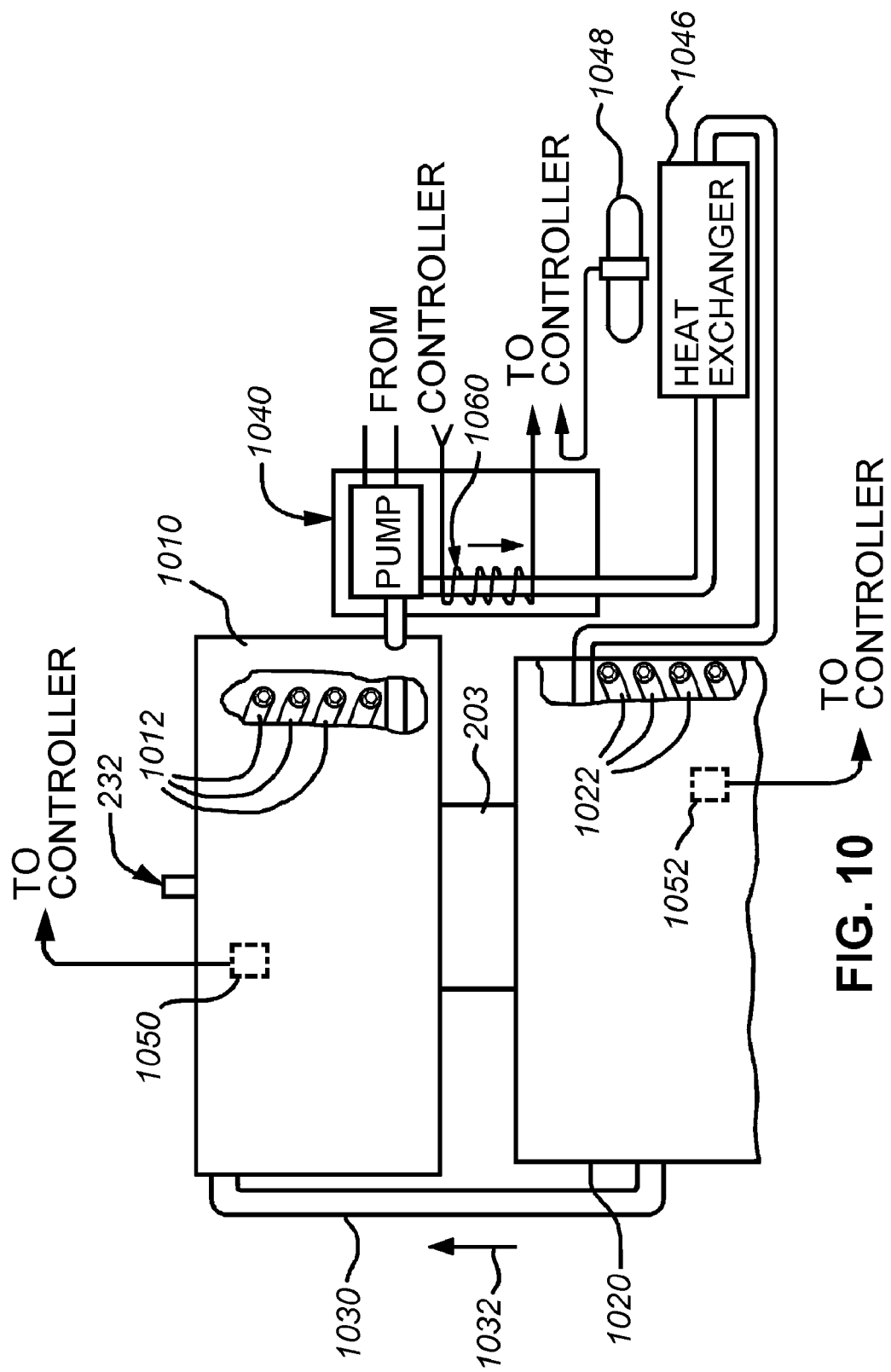
FIG. 10 is a partially exposed side view of a combined MICE cylinder casing cooling head and plenum heating arrangement with auxiliary heat and heat exchanger according to an illustrative embodiment.

Since, at various times the plenum requires heat and the cooling head either requires heat (startup) or may need to reject heat (steady state operation), it is contemplated that an integrated heating and cooling system using moving fluid can be provided in an illustrative embodiment. FIG. 10 details a somewhat schematic side view of the area of the cylinder head casing 203 with a cooling head 1010 similar to the head 510 described above and an intake plenum 1020, also similar to the plenum 220 described above. The Cooling head 1010 and the plenum 1020 each include an internal coil of fluid lines or conduits 1012 and 1022, respectively. The coils can be mounted externally, or at another position so long as they act to transmit heat between the underlying structure and the fluid, which they carry. The coils in each structure are connected at one end by a linking conduit 1030 that routes a flow of fluid (arrow 1032) therebetween. The coils 1012 and 1022 are each connected at an opposing end by a fluid pump assembly 1040, which can be placed at a location relative to the MICE generator. A remote heat exchanger 1046 can also be provided to remove excess waste heat, using a controllable fan 1048 where appropriate. The heat exchanger would typically operate at high output states and or when operating in hot climates.

The pump assembly 1040, including an interconnected electrically driven pump 1042 is interconnected with the controller (not shown in FIG. 10). The pump operates to selectively move fluid between the coils 1012 and 1022 when the temperature sensor in either the cylinder head (sensor 1050) or plenum (1052) reports a predetermined condition (too hot, too cold, just right). In this manner, during steady state operation (post start-up) heat generated by the cylinder head is carried away via the cooling head coil 1012 and delivered to the plenum 1020 when needed. Excess heat, not needed to heat the plenum is exhausted through the heat exchanger. As noted above, one parameter by which plenum heat is regulated may be the desired power output. This parameter can be combined with the plenum temperature sensor 1052 to provide the controller with a decision on the amount of heat to deliver to the plenum.

During cold-startup, all components are typically at, or near, ambient temperature. As discussed above, a mechanism for warming the cylinder head 203 and plenum is desirable. In this embodiment, an electrical resistance heater 1060, responsive to the controller is provided in line with the fluid conduits, externally of the MICE generator. This heater can be provided at the heat exchanger or at any convenient location along the fluid path that affords rapid and efficient heating of the fluid stream to a desired temperature. The heater is operated in conjunction with the pump to deliver heated fluid to both the cooling head and the plenum until a timer and/or the temperature sensor(s) 1050 and/or 1052 indicate a sufficient startup heat has been attained. The heater's output is then shut off or reduced and startup is allowed to proceed. Alternatively, a separate electrical heater can be provided directly to either (or both) of the cooling head and plenum to be used at startup, after which the fluid-based heat-transfer system of FIG. 10 takes over. As a further alternative, any of the arrangements described herein (e.g. fluid-based heating, resistance heating, etc.) can route heat directly to intake air, prior to mixing with fuel. Additional heat-transfer arrangements are described below with reference to alternate embodiments.

E. Sound Dampening

It has been recognized that, without acoustic dampening, the MICE generator according to various embodiments contemplated herein is capable of producing sound pressure measurements in excess of 112 dB at approximately 1-foot distance therefrom. This is an extremely loud sound output that would render the MICE generator unsuitable for most field application, and possibly harmful to users' hearing. By providing effective silencing and dampening to the MICE generator and the overall generator system packaging, the effective sound pressure can be reduced to less than 55 dB, making it useable for a wide variety of applications where relatively quite operation is sought.

Figure 11:
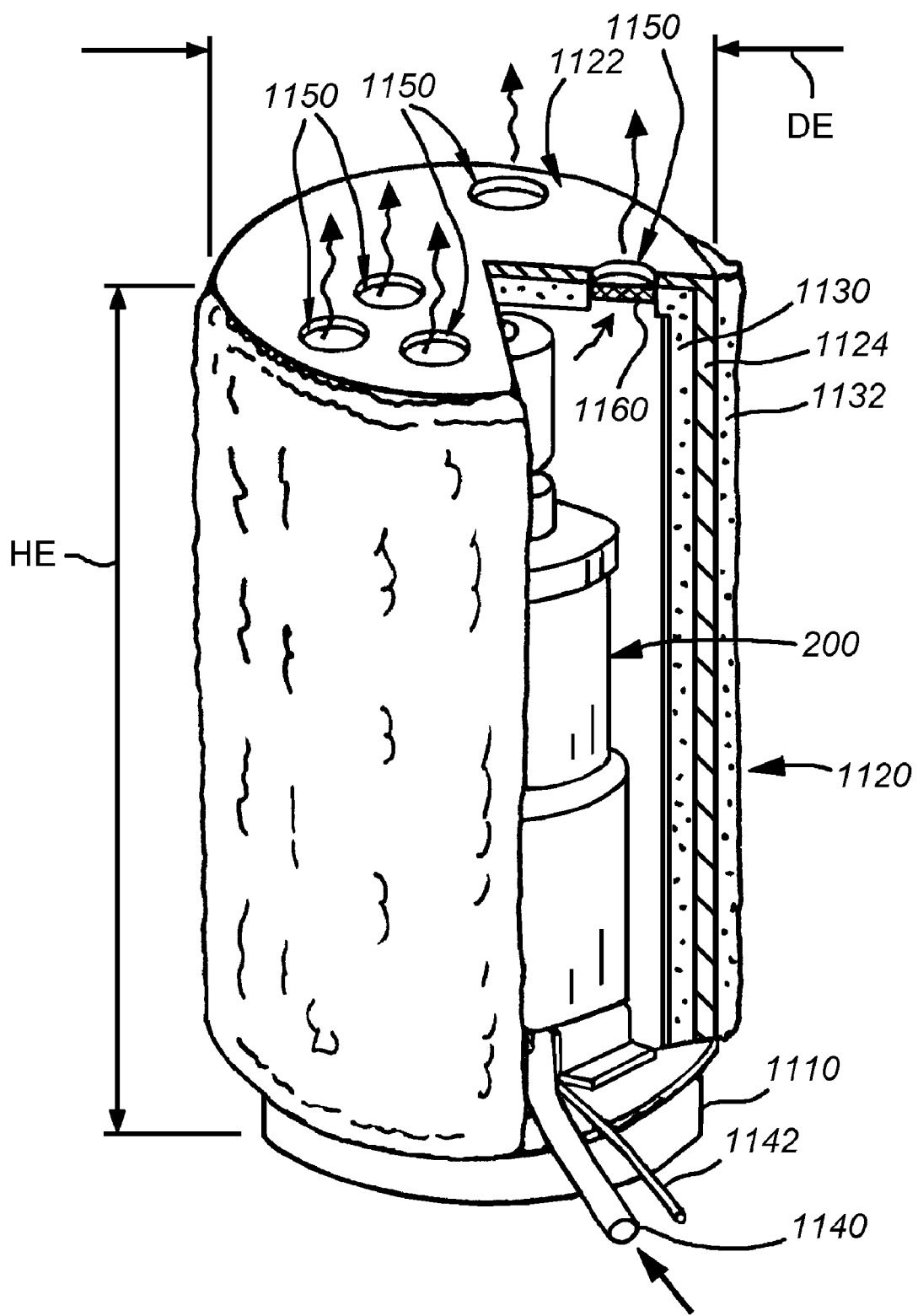
FIG. 11 is a partially exposed perspective view of a sound-dampening, acoustic enclosure for the MICE generator according to an illustrative embodiment.

FIG. 11 details a basic configuration for isolating the MICE generator 200 according to an illustrative embodiment. In this embodiment, an internal muffler (see, for example, muffler 520 in FIG. 5) is provided in proximity to the exhaust port of the MICE generator. As described below, in certain alternate embodiments, the muffler can be provided remote from the MICE generator and interconnected via a sound-dampened exhaust conduit. The MICE generator is mounted on a mounting plate 1110 sufficient to support the weight of the MICE generator and the acoustic enclosure (constructed from ⅛ to ¼-inch aluminum, for example). The plate 1110 supports an outer enclosure 1120 that is generally cylindrical in shape in this embodiment (other shapes can be employed), with an enclosed top end 1122. In one embodiment, the shell 1124 of the enclosure 1120 is constructed from sheet steel having a thickness of approximately 0.03-0.05 inch. The exact composition and thickness of the enclosure shell 1124 is highly variable and determined by the acoustic dampening and weight requirements. In this embodiment the overall outer diameter DE of the enclosure is approximately 6.5-9 inches. The overall height HE of the enclosure is approximately 16-18 inches. The dimensions are highly variable, based upon the size of MICE generator attached components such as the cooling head and the muffler. Both the interior and exterior of the enclosure may be wrapped with a thin layer (⅛-¼ inch, for example) of acoustic foam 1130 and 1132, respectively. The foam can include heat shielding foil (not shown) on the interior and/or exterior where in proximity to a heat source, such as the muffler. In general, best performance is attained when both the muffler and the inlet pipe are tuned to the particular sound signature of the enclosure 1120 using well-known tuning techniques based upon formulae and/or trial and error.

In alternate embodiments, a separate mounting plate can be omitted and the shell 1124 of the acoustic enclosure can be mounted directly on the floor of an external package enclosure (see external packages in FIGS. 14-15 below) along with the MICE generator. For the purposes of this description, the floor upon which the MICE generator and/or shell is supported can be termed generally a "support surface" and the term "plate" can otherwise be taken broadly to include unitary and integral base structures that are part of the external enclosure of the generating system unless termed a "separate" plate.

The inlet tube 1140 for fuel/air mixture is routed through an appropriately sized (closely-fitting) hole in the enclosure. The hole can also route various electrical and fluid conduits (collectively shown as lead 1142), such as the alternator leads, temperature sensor leads, the glow plug lead, and other control cables. In this embodiment, exhaust is expelled via six or more 1-inch diameter holes 1150 formed in the top 1122 of the enclosure. The number, size and placement of the holes are each highly variable. In general, each hole 1150 is covered from the inside by a porous plug (see plug 1160) constructed from porous glass fritted or ceramic material approximately 8-12 millimeters in thickness. The plugs in this embodiment have a pore size of between 10-20 microns, thereby delivering a flow resistance of approximately $6.6 \times 10^{-4}$ atm/(cm/s) for a flow area of approximately 30 cm² (corresponding to a 4-inch H₂O pressure drop for a flow rate of 40 slpm). Such flow resistance provides effective dampening without excessive back pressure within the enclosure.

As described below, the MICE generator 200 and enclosure 1120 are mounted within an external package with further sound dampening. Appropriate venting of exhaust from the enclosure plugs/holes 1150/1160 to the environment is provided in the external package.

F. Vibration Isolation

Figure 12:
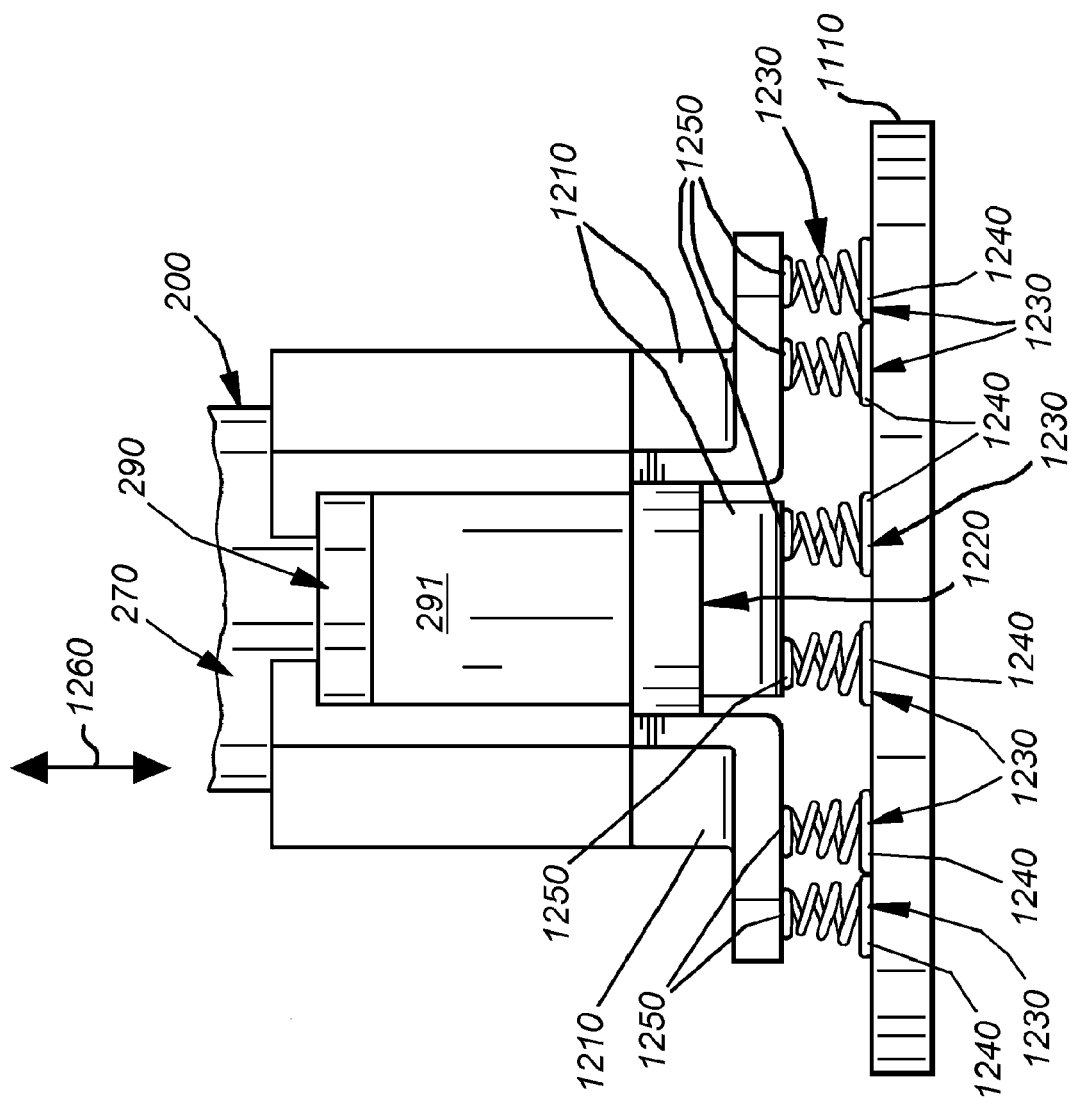
FIG. 12 is a fragmentary side view of the vibration isolation assembly including the acoustic enclosure base plate and MICE generator mounting assembly according to an illustrative embodiment.

The inline piston-spring-alternator coil employed in the MICE generator according to this invention generates substantial oscillatory motion within the overall casing generally along the axial direction this vibration is capable of generating significant sound emission between the MICE generator and its supporting base, even absent any combustion-generated sound. FIG. 12 details a vibration-isolation arrangement in which the MICE generator 200 is provides with three equally circumferentially spaced L-shaped base "feet" 1210. The number and placement of feet about the MICE generator's circumference is highly variable. In this embodiment the feet 1210 are essentially clamped to the alternator casing 291 between the clamp 290 and bottom 1220 of the alternator casing 291. A variety of arrangements for feet, including those that are unitary parts of the casing are expressly contemplated. In general, they should be securely attached to the MICE generator 200 without any movement between the feet and the MICE generator.

The feet 1210 each rest on one or two soft springs 1230, which are mounted on the base plate 1110. In this embodiment, the springs 1230 each are conical tapering from a larger-diameter coil 1240 adjacent the base plate 1110 to a smaller diameter coil 1250 adjacent to each respective foot 1210. This design affords good stability and resistance to transverse shear. The springs allow free vibration of the MICE generator along the axis (double arrow 1260), in line with piston motion, but the springs 1230 are sufficiently strong to prevent the feet 1210 from bottoming on the base plate. In actual tests, this approach has essentially eliminated transmission of vibration from the MICE generator to the external package.

Figure 13:
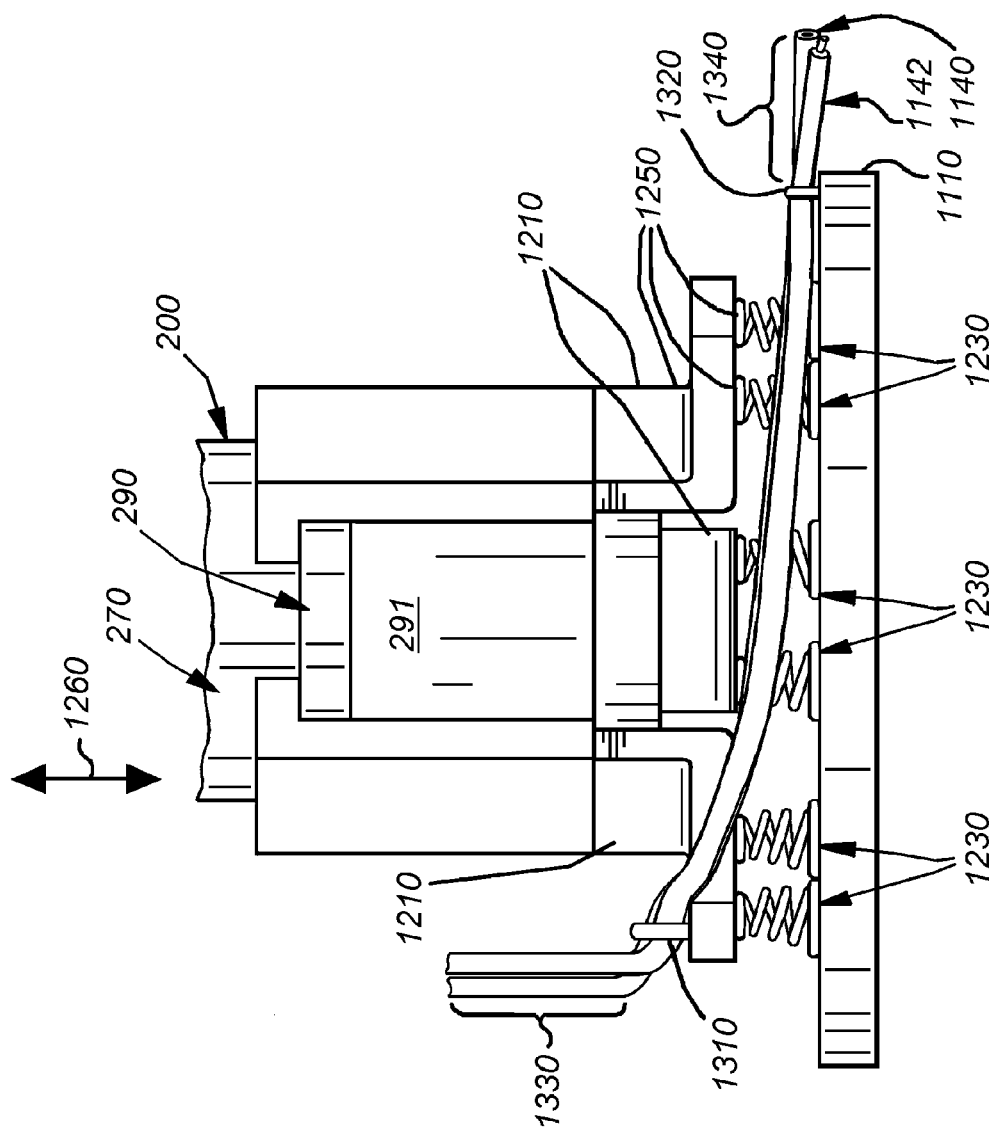
FIG. 13 is a fragmentary side view of the vibration isolation assembly including the enclosure base plate and MICE generator mounting assembly further detailing the fixed attachment of intake and electrical leads to the MICE generator and base plate according to an illustrative embodiment.

FIG. 13 shows an example of flexible lead placement as part of the vibration isolation solution of FIG. 12. According to an illustrative embodiment, the various leads and intake tubing (1142 and 1140) can be "staked" at two locations using clips, ties or similar fasteners 1310 and 1320. In this example, one fastener secures the lines 1140, 1142 at the side of the MICE generator casing (on a foot 1210) in this example. Any suitable location on the MICE generator above the springs 1230 can be employed. The other fastener 1320 stakes the leads 1140 and 1142 near the outlet hole, leading out of the enclosure (removed for clarity) on the sturdy base plate 1110. The region 1330 above the fastener 1310 is essentially free of flexure or bending, as it is fully contained along the solid case of the MICE generator between the fastener 1310 and interconnections to various parts of the MICE generator. Similarly, the region 1340 extending out from the base plate fastener 1320 is free of any bending or flexure. The area of leads between the fasteners 1310 and 1320 is long enough and oriented so that is flexes, in essence, as a solid body as the MICE generator oscillates on its springs 1230 with respect to the base plate. Thus, the long solid body-like lead section is less likely to fail over the long term due to fatigue, etc.

To afford further support to the oscillating MICE generator in alternate embodiments, appropriate springs (not shown) can be provided between the top of the enclosure or package and the MICE generator, which further support and isolate the MICE generator from vibration and lateral shear. Likewise, radially or laterally mounted springs can be provided between the casing of the MICE generator and the sidewalls of the enclosure to afford greater lateral support. Alternatively, springs mounted at some angle (at 45 degrees relative to the base, for example) can provide both axial and lateral support, thus replacing a combination of axial and radial springs.

G. Arrangement and Packaging of Generation System Components

The MICE generator of the above-described embodiment is packaged as part of an overall power-generation system that is relatively lightweight and portable—for example, weighing approximately 20 pounds and sized approximately 14×12×7.5 inches in one version. Within this relatively this small "external" package is the capability of generating a continuous electrical output of 500 W or more. The packaging takes into account sound and vibration dampening and also provides adequate aspiration of fuel, exhaust ejection, thermal regulation, automatic startup capability and speed/output regulation.

Figure 14:
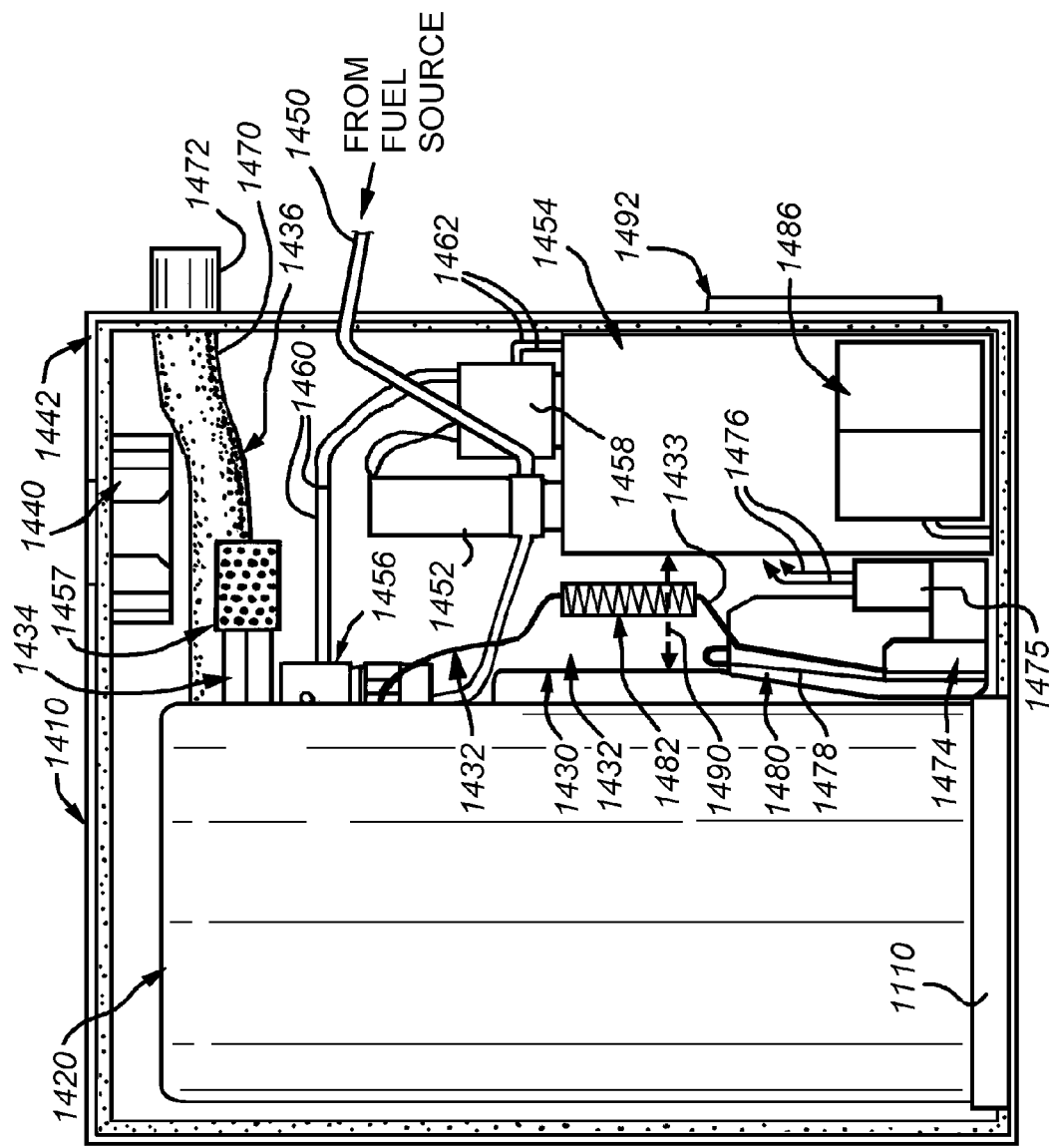
FIG. 14 is a side cross section of an exemplary packaging arrangement for generating system components according to an illustrative embodiment.

An exemplary packaging arrangement is shown in FIG. 14. This packaging layout is desirable in instances where an external fuel source and exhaust system are provided, such as in a land or water-going vehicle. A more-self-contained version of the external package will be described below. The arrangement of FIG. 14 consists of an external package enclosure 1410. This enclosure 1410 is constructed from metal (typically sheet steel or aluminum), polymer or a combination of materials. The external package 1410 encases a sound-dampened MICE generator acoustic enclosure 1420 with MICE generator and cooling, exhaust and sensing components therein, similar or identical to that described above. External dampening foam surrounding the acoustic enclosure 1420 has been omitted from the illustration for clarity but is typically present in an illustrative embodiment. The acoustic enclosure includes inlets and outlets formed therethrough to allow passage of external cooling tubing 1430, 1432, a fuel/air mixture inlet 1434 and an exhaust outlet 1436. An electric fan 1440 with an external port 1442 is provided to draw in cooling air. An appropriate outlet (not show, can be provided along a side wall at a location opposite. This fan allows combustion make-up air to enter the housing and generally cools the electronic components and heat exchanger within the MICE generator cooling loop. Note, in an alternate embodiment, the inlet 1434 can be provided near the base 1110 of the acoustic enclosure 1420 to take advantage of the staking of leads between the MICE generator and base 1110 as described above, referencing FIG. 13.

The fuel-delivery system consists of an inlet fuel line 1450, fed from an external source. An internal fuel tank of appropriate size can be provided in an alternate embodiment. The fuel line 1450 leads to a solenoid fuel pump 1452. This pump is controlled by control circuitry that can be located in a controller enclosure 1454 that also contains appropriate AC/DC power conditioning electronics. The pump feeds fuel to a micro-electro-mechanical systems (MEMS) fuel atomizer 1456 commercially available from a variety of suppliers. Other types of atomizers (ultrasonic, for example) can be used in alternate embodiments. The atomizer is controlled by associated circuitry 1458 through leads 1460. The circuitry communicates with the controller 1454 through leads 1462. An air inlet 1457, shown covered with a porous filter medium (bronze, for example), is provided in connection with the atomizer 1456. Atomized air and fuel mix at the junction therebetween and form the vaporized fuel/air mixture entering the MICE generator intake plenum. In this manner, no complex fuel injection is needed, even when employing low-volatility diesel-like fuels.

In this example, porous plugs for venting exhaust gasses are omitted. As such the exhaust is vented, either directly from the MICE generator exhaust port or through a muffler within the enclosure, to an external exhaust tube 1436 constructed from, for example stainless steel tubing of between ¾ and 1½-inches in diameter. The tubing is overlaid with acoustic foam 1470 (and thermal insulation where appropriate). The diameter of the tubing can be selected, in part, to provide a tuned acoustic signature for a given steady-state level of power output. The outlet 1472 of the exhaust tubing 1436 is directed to a vehicle exhaust header or external muffler in this embodiment.

The MICE generator within the enclosure 1420 is cooled by a cooling system that includes a cooling pump 1474, driven by an electric motor 1475 that is powered through the control electronics 1454 (via leads 1476). The pump pulls fluid through the tube 1432 into the cooling head of the MICE generator. It draws fluid from the tube 1478 that passes through a reservoir 1480 also connected to the cooling head tube 1430. In one embodiment a flow rate of approximately 250 ml/min should be sufficient. A heat exchanger 1482 is provided internally in this embodiment between tubes 1432 and 1432 in the fluid circuit. The heat exchanger can be sized and positioned to present as large a surface area to the fan-driven (1440) airflow as needed. Alternatively, the heat exchanger can be external of the package enclosure 1410. Where external cooling is employed, the cooling system can also be interconnected to an appropriate external cooling system, such as a watercraft cooling circuit or vehicle cooling system.

The external package 1410 supports a storage battery 1486 consisting of a cluster of rechargeable batteries. Batteries are needed to support startup operations as described generally above. In particular, intake and MICE generator preheat operations may require temperatures around the intake and head to be elevated by approximately 100 degrees C. from ambient temperature. In addition, startup is achieved (described further below) by energizing the glow plug, and selectively powering the alternator coil to oscillate the piston (since the alternator can be used in reverse as a motor) until continuous combustion is achieved. It is estimated that the overall power requirement to achieve startup in approximately one minute is about 320 W for a MICE generator in the 300-500 W power output range. An array of six high-quality nickel-metal-hydride (NiMH) battery packs, each discharging approximately ⅙ of their total energy during startup, should be sufficient to ensure reliable operation. Such batteries would have a total weight of approximately 0.4 kg (assuming an energy density of 80 W-hr/kg) and a volume of approximately 100 cc. Other types of energy storage are expressly contemplated, including capacitors, lithium-based batteries, and lead-acid batteries where appropriate. Similarly, in certain vehicle applications, startup power can be obtained from external power systems or manually-cranked systems.

The control and power conditioning circuitry is contained in the circuitry enclosure 1454. A dashed line 1490 represents the various power, control and sensing leads that pass between the control circuitry 1454 and the MICE generator through appropriate ports(s) in the acoustic enclosure 1420. The circuitry enclosure 1454 can be electromagnetically shielded where appropriate and can be sealed to prevent infiltration of moisture that may damage components. The controller for system operations can consist of a microcontroller, microprocessor, programmed logic array or a combination of such components. The controller is interconnected with various power and temperature sensors as described herein and can contain appropriate timers to regulate functions, such as startup preheat, etc. The controller interacts with power conditioning circuitry that receives raw AC output from the alternator and converts it to a desired voltage and current type (AC or DC). Since the output in this embodiment (highly variable according to alternate embodiments) produces 24-28 VDC, the alternator output is first routed through a rectifier (described below) consisting of a diode bridge, inductor and two capacitors. The resulting DC current is then stabilized to 24-28 volts using a converter module that can be based around a Model V300A24C500B DC-DC converter available from Vicor of Andover, Mass. This module is sized for approximately 500 W and will deliver 24-28 VDC from an input voltage (at the alternator) of between 180 and 375 V. The size of the overall package that houses the power conditioning circuit is approximately 3×4×7 inches and weighs approximately 1 kg in an illustrative embodiment.

The external package enclosure includes connections/outlets that allow interconnection of power leads from a device to the generating system. A side panel 1492 is electrically connected to the circuitry 1454 and includes one or more appropriate outlets (not shown) for linking the power lead to the generating system. Likewise, this panel 1492, or another panel on the exterior can include one or more indicators or meters (analog, LCE, LED, etc.) that report system status, power output, warnings and/or other key information. A start button can also be provided.

Figure 15:
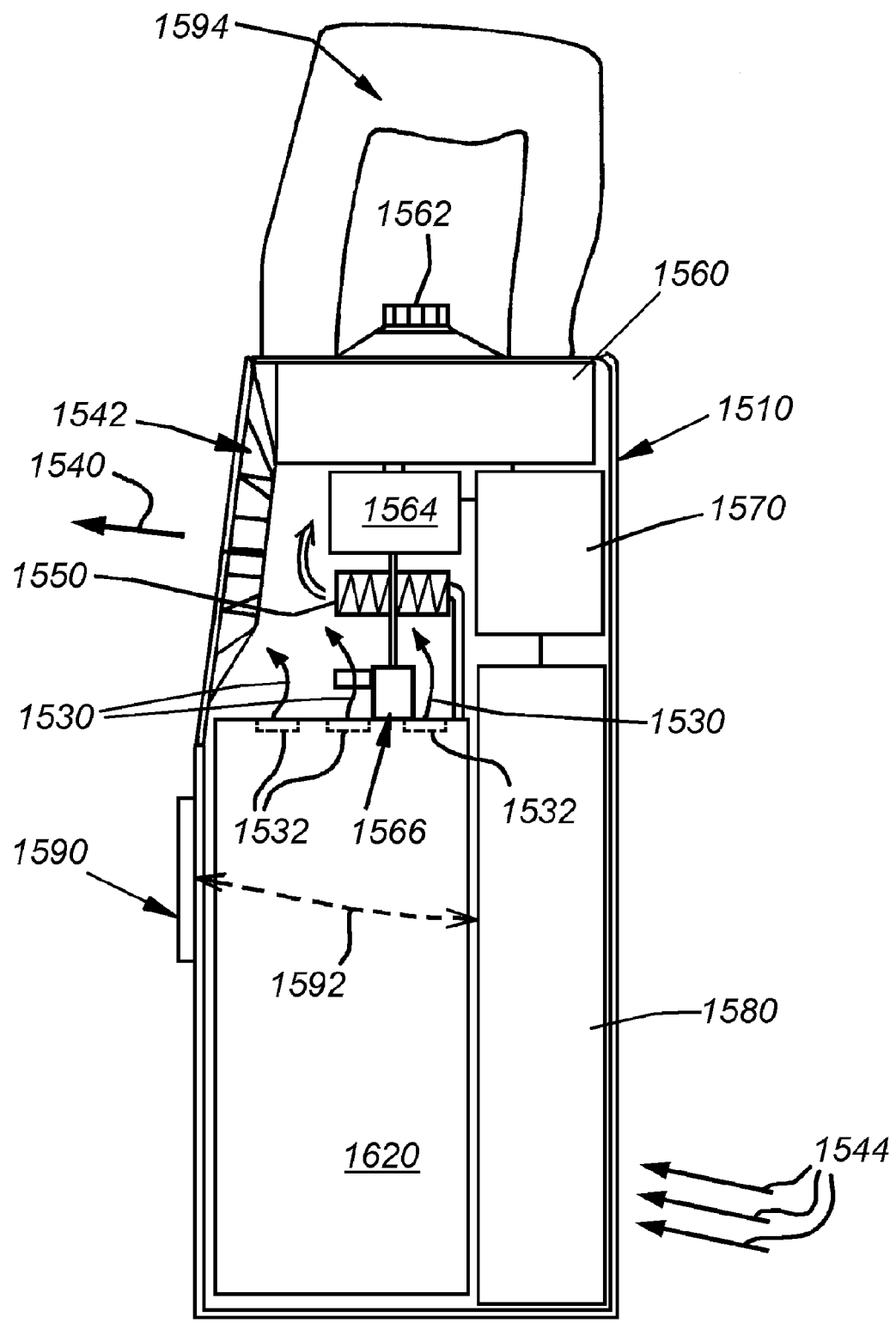
FIG. 15 is a side cross section of an exemplary packaging arrangement for generating system components according to an alternate embodiment.

It should be clear that the placement and size of components within the external package is highly variable. The overall arrangement may be based, in part upon the mission, for which the system is designed. Briefly, FIG. 15 shows an alternate arrangement of components for a fully self-contained and portable version of the system. The external package enclosure 1510 can be constructed from metal or durable polymer and include internal sound-dampening material (foam, not shown). The MICE generator is contained in an acoustic enclosure 1520 as described above. In this version, a tuned, internal muffler (not shown in FIG. 15) is contained within the acoustic enclosure 1520 and vents exhaust (arrows 1530) into the external package space via porous plugs 1532. Air (arrow 1544) is passed through the external package enclosure space by an electric fan 1542 that drives warmed air (arrows 1540) out of the space through an air intake located at the bottom rear as shown (or at another position) on the enclosure 1510. The fan can also be used to vent exhaust as shown, or a separate muffler outlet can be used. The air passes over an internal heat exchanger 1550 that is connected to a reservoir and pump (not shown), feeding coolant to the MICE generator through the acoustic enclosure 1520. A fuel tank 1560 with a fill cap 1562 is located at the top of the housing. The fuel is driven into an atomizer 1566 that feeds the MICE generator a vaporized fuel/air mixture. A battery 1570 is provided for startup and control/power conditioning circuitry is contained within an enclosure 1580. A panel 1590 with power connections, status meters and switches is located on a side face, but can be located at any convenient position (or positions) on the enclosure 1510. The panel communicates with the circuitry 1580 via leads (dashed line 1592). A carrying handle 1594 is provided at an appropriate balance point at the top end of the enclosure 1510 for ease of portability. As noted above, an overall package weighing only about 20 lbs. is contemplated, rendering it easily portable with one or two carrying hands by a single individual.

H. Startup Sequence

Figure 16:
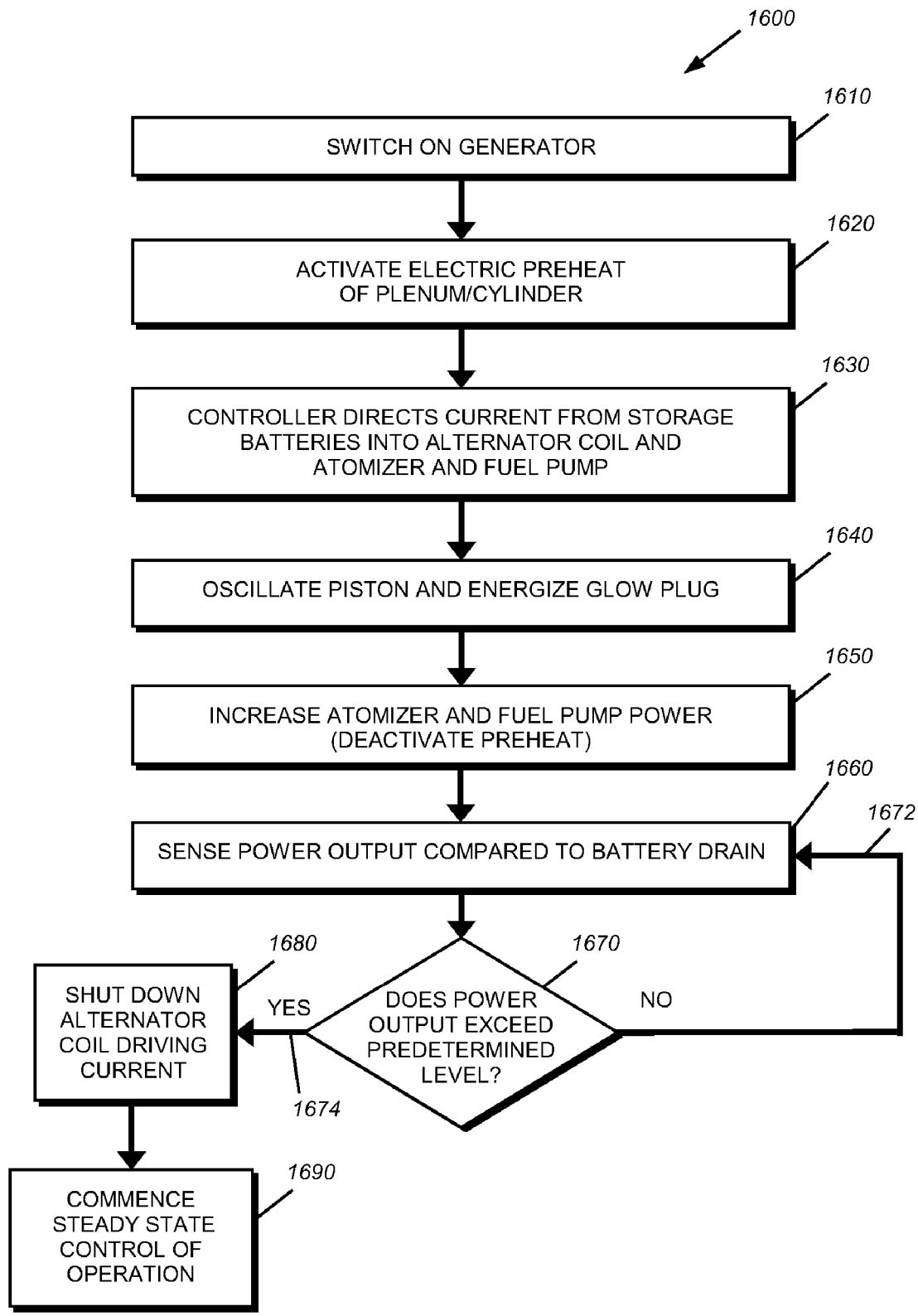
FIG. 16 is a flow diagram detailing an exemplary start-up procedure for the MICE generator according to an illustrative embodiment.

Having described generally the components employed to effect startup of the MICE generator, reference is now made to FIG. 16, which details an exemplary startup procedure 1600 according to an illustrative embodiment.

Clearly, the first step is to switch the generating system to start (step 1610). This action directs to control circuitry to energize the electric preheater used to warm the air intake (plenum) and cylinder head (step 1620) when low-volatility fuels are used. This step can be eliminated if gaseous fuels such as propane or butane are used. The glow plug may also be energized at some point within this step, depending upon how much heat can be derived from the plug to warm the head and the combustion chamber. The power to heat the intake and head is derived from the storage batteries described above. These batteries are recharged by conventional charging circuitry operatively connected to the power output circuit during steady state runtime.

After the control circuitry detects that sufficient preheat has been applied, either through use of a timer or a temperature sensor at an appropriate location within the intake and/or cylinder head, the control circuitry then activates the atomizer and fuel pump at a minimal setting (step 1630). At this time, the control circuit also directs power into the alternator coil of the MICE generator. This effectively converts the alternator into a linear motor that oscillates the piston (1640). If gaseous fuels are used (such fuels being contemplated for use in alternate embodiments of the MICE generator configuration described herein with conventional changes to allow gaseous fuel intake), this step is initiated immediately after the MICE generator system has been switched to start. The direction, amplitude and frequency of the current are chosen so that the coil causes a pulsation in piston shaft that deflects the spring and causes it to rebound, thereby forcing the piston between its bottommost and topmost positions. This selectively opens and closes the exhaust, inlet and transfer ports while vaporized fuel begins to enter the upper piston chambers. The glow plug is fully energized at this point (if not previously energized as noted above) to effect combustion when fuel and air are compressed at the topmost position.

As combustion begins to occur, the control circuit increases the fuel flow as needed to support independent piston operation (step 1650). For liquid fuels, the control circuit increases the atomizer and fuel pump power to admit more fuel, the control circuitry now detects power output from the power circuitry (step 1660). If power output exceeds battery drain by less than approximately 60 W (decision step 1670), then the driving of the alternator coil continues (branch 1672) until the predetermined output level is detected. When power exceeds the predetermined level (branch 1674), the control circuit disconnects the battery pack from the alternator coil (step 1680), and the system enters steady state operation (step 1690), gradually transitioning from uneven operation to relatively even, steady output as fuel flow is adjusted to a steady level and MICE generator operational temperature reaches a relatively constant value. At some point, the preheater is deactivated, as sufficient latent heat exists in the intake and head, and can be supplemented by fluid-driven heat exchange systems as described herein. Control of temperature and fuel flow are regulated on an ongoing basis by the controller based upon power drain, sensed temperature and other parameters described herein and generally contemplated for controlling operation of a combustion engine.

Briefly, deliberate shutdown of the generating system occurs when a shutoff signal is transmitted via a switch to the control circuitry. In an illustrative embodiment this causes the fuel pump to shut down, stopping fuel delivery to the MICE generator and allowing any fuel remaining in the inlet system to be consumed before stoppage occurs. Subsequently other components are shut down as the alternator coil no longer delivers current. In the case on inadvertent shutdown (stalling) the circuit may undertake one or more attempts at an automatic restart procedure (similar to FIG. 16). If a certain number of attempts fail, the system then indicates a problem condition (or lack of fuel).

I. Dual Clipper Circuit and Overstroking Considerations

As discussed above, in steady state operation the alternator coil produces an AC (approximately 110 Hz) power output in the range of approximately 180-375 volts in this embodiment. The output voltage level may vary significantly between cycles and is dependent upon the amplitude of the piston stroke. There are no physical limit stops in normal operation, restricting the stroke in this embodiment, and thus, the relative force of combustion versus resistance applied by the MICE alternator and energy storage by the spring sets the appropriate limit.

Figure 17:
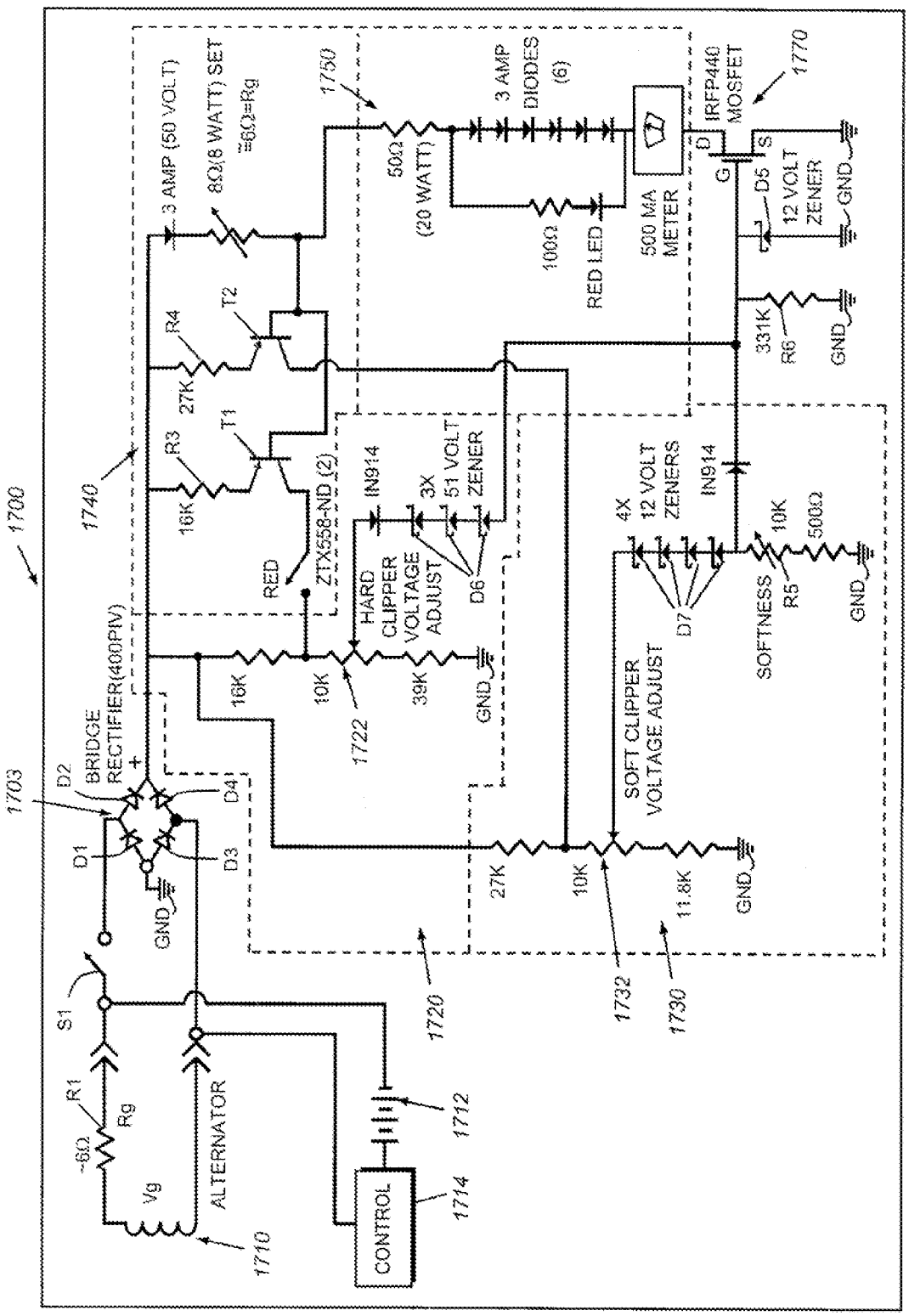
FIG. 17 is a schematic circuit diagram of a dual clipper circuit operatively connected with the MICE generator electrical output for regulating overstroking and load in accordance with an illustrative embodiment.

Accordingly, FIG. 17 details a circuit diagram 1700 in which the alternator coil 1710 outputs alternating current when switched by the switch S1 to a full-wave, diode bridge rectifier 1703 (diodes D1 -D4). An inherent 6-ohm (approximate) coil resistance is represented as the resistor R1. This resistance is appropriate for a coil designed for electrical iron magnet poles generally contemplated for use in the alternator of this embodiment. The diode bridge D1-D4 delivers DC current of varying voltage between the positive output (+) and ground GND. Two clipper circuits are also interposed between (+) and GND. These consist of a "hard" clipper circuit 1720 that is adapted to address overstroking and a "soft" clipper circuit 1730 that addresses electronic load control. The switch S1 is closed to provide the loads of the two clipper circuits to the alternator once the MICE generator is running on its own power and the startup batteries 1712 are disconnected. This can be accomplished automatically, as discussed above, by triggering the switch S1 based upon excess power greater than (for example) 60 W. Note that a controller 1714 is provided in connection with the batteries 1712 to selectively connect and disconnect them and to drive the oscillation of the alternator coil 1710 during startup at the resonant frequency of the overall mass-spring combination of the MICE generator.

A current compensation circuit 1740 consisting of transistors T1 and T2 and associated resistors R3 and R4 (16 K-ohm and 27 K-ohm, respectively) interconnect with each of the hard clipper 1720 and soft clipper as shown. The compensator corrects the measured engine voltage in the clipper circuit to provide the actual velocity-induced voltage, which more accurately represents piston speed and stroke—based upon the voltage value equal to the instantaneous alternator current multiplied by the DC resistance of the alternator.

An output current meter circuit 1750 is also provided in this example. It can be omitted in alternate embodiments.

In this embodiment each clipper circuit 1720, 1730 is adjusted manually by an associated rheostat 1722 and 1732, respectively. Each rheostat allows the load of the given clipper to be adjusted to either limit or maintain at the voltage in a predetermined range (for example, 250-253 V). The voltage and current flow and current through the circuit is monitored, as such. If the measured voltage level in the hard clipper 1720 deviates significantly above the exemplary set voltage of 250-253 V, then this indicates an overstroking condition and the prevailing load on the alternator increased by the depicted IRFP440 MOSFET 1770, thereby restoring the desired voltage range through the hard clipper 1720. This can be accomplished automatically by digital or analog controllers that link with an appropriate variable resistive component in the place of the rheostat 1722.

Likewise, if the measured voltage level of the soft clipper 1730 deviates significantly from the exemplary 250-253 V, then the load is out of balance with the alternator output and the soft clipper 1730 changes and rebalances the load through the action of the MOSFET 1770 to restore the exemplary voltage level. The rheostat 1732 can also be set or readjusted automatically by digital or analog controllers that link with an appropriate variable resistance component in place of the rheostat 1732. Note that the soft clipper circuit 1730 includes a 10 K-ohm variable resistor R5 in this embodiment that enables the "softness" of the load regulation to be varied within predetermined bounds. This allows for more-aggressive or more-relaxed response to a load imbalance. In practice, a set level of softness may be preset by appropriate resistors, or can be applied variably by the controller for differing overall power levels and/or operating conditions.

As shown in FIG. 17, the paired 12-volt Zener diode D5 and 33 K-Ohm resistor R6 serve to respectively, limit the voltage produced on the control terminal (gate) of the MOSFET 1770, and to set the currents drawn through the series connected multiple Zener diodes (exemplified by three 51-volt Zener diodes D6 connected in series and four 12-volt Zener diodes D7 connected in series) to an optimum value for the Zener diodes. The MOSFET 1770 is one embodiment of a power-controlling device which can be dynamically adjusted by a voltage or power-measuring system to balance the power drawn from the alternator.

Figure 17A:
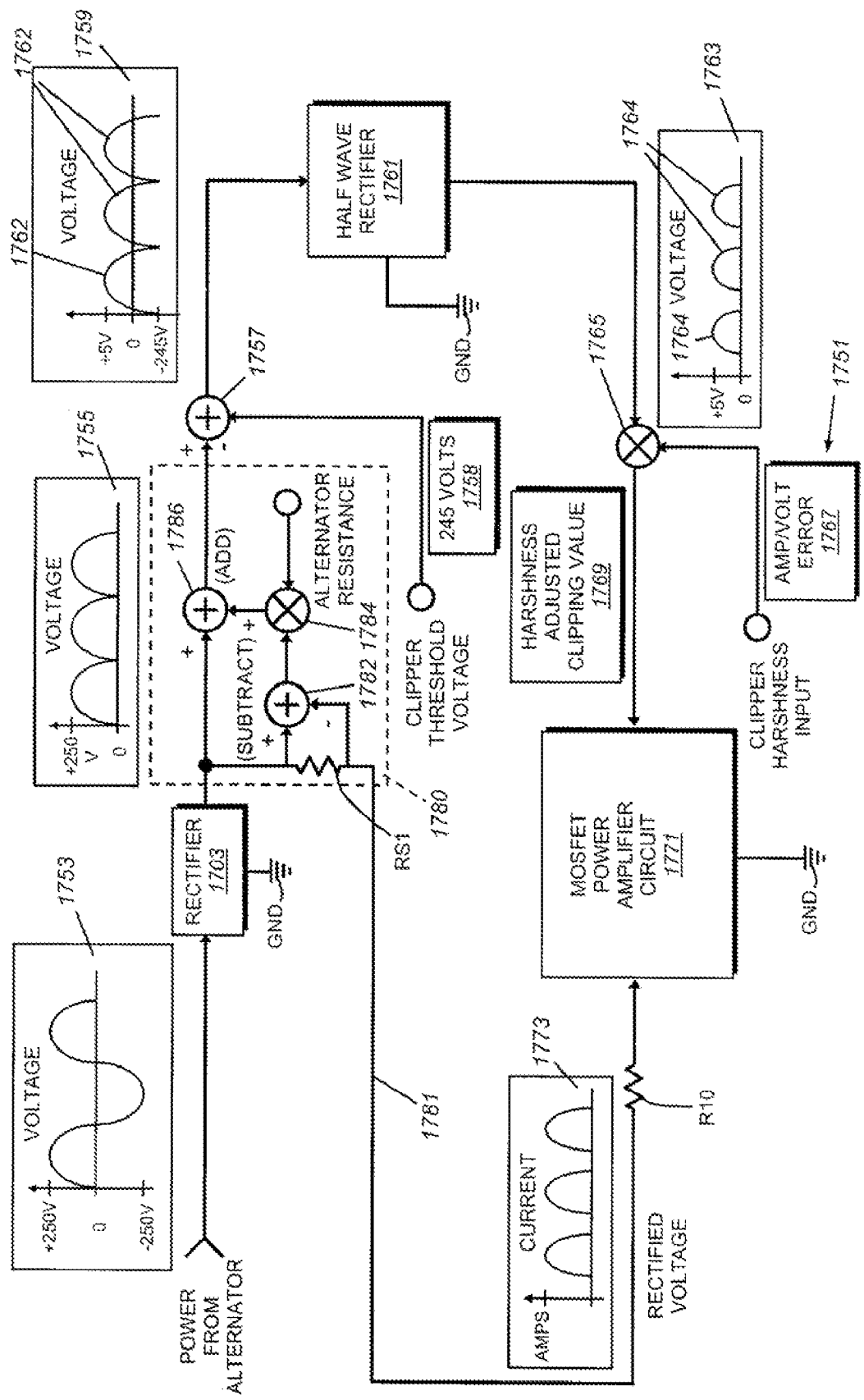
FIG. 17A is a block diagram of a clipper circuit according to an alternate embodiment providing discretely adjustable threshold level and harshness.

In a further embodiment, the harshness or sharpness of the clipper circuit is controllable. In this manner, the clipper performs its clipping function in an adjustable way, by controlling amps/volt, which eliminates the harsh transition as clipping is applied—even in instances in which the sharpness is infinite amps/volt (e.g. where the voltage is absolutely clipped at the chosen threshold level and cannot exceed it). According to this arrangement, the clipper circuit will draw 1 amp for each volt that the input exceeds the threshold voltage. With reference to FIG. 17A, a block diagram of the modified clipper circuit 1751 is shown. It should be clear that the various circuit elements described herein can be implemented by principles and components that are known to those of ordinary skill.

As shown in FIG. 17A, the circuit receives an input from the alternator as described generally above. The alternator coil input provided by the alternator is defined generally by the input waveform 1753. This waveform, optimally ranges from −250 to +250 volts, but can vary substantially above or below this desired range due to excursions of the piston outside predetermined limits, and other transient conditions, as described above. These excursions can be controlled using the clipper circuit in combination with a MOSFET (or other power-control chip) to increase the load on the coil and thereby attenuate such excursions. The input waveform 1735 is rectified using the above-described full-wave rectifier 1703, or another appropriate circuit. In practice, the existence of lower voltage components often necessitates the use of lower voltages. Note, while the voltage values herein are discussed in terms of their full operating levels, the circuit may employ a lower voltage. In one example, the input voltage is divided by a factor of approximately 34.

The resulting rectified waveform 1755, ranging from 0 to approximately +250 volts (or 0 to −250 volts), is provided to a subtraction circuit 1757 that subtracts a threshold voltage 1758 of 245 volts (or the appropriately divided (reduced) value) from the waveform 1755 to yield the resulting waveform 1759 in which the voltage ranges from +5 volts to −245 volts. The threshold voltage can be set using a conventional potentiometer. Notably, unlike the above-described dual clipper, the threshold voltage in this embodiment may be discretely controlled and set.

The result of the subtraction is then subjected to a half-wave rectifier 1761 so that only the peaks 1762 above 0 volts are retained. These peaks produce the waveform 1763. Since the peak 1764 in the waveform 1763 each indicate a clipping event, it is desirable to draw away appropriate current from the alternator during these events. The circuit includes a discrete harshness circuit 1765 that applies a gain (a multiplier) to the output based upon the degree of clipping. This dictates the level of draw from the alternator coil of a predetermined amperage per each volt of clipping. In this manner, the degree of clipping is fed back through the circuit 1751 to produce a load based upon the input level of amp/volt error 1767 (for example, 1 amp load for every 1 volt of clipping, so that a 5 volt clip draws 5 amps). The harshness circuit 1765 can be adapted to respond linearly, to a given amp/volt error or according to a predetermined curve. In general, a harshness circuit can be implemented using conventional operational amplifiers that apply an appropriate gain to the harshness signal based upon the amp/volt error. The setting of the amp/volt error can be implemented using a variable potentiometer (a 100 K-ohm potentiometer in this example). It should be clear that varying the amp/volt error 1767 varies the harshness of the clip. A high amp/volt error will cause rapid (but not absolute) clipping effect, while a lower amp/volt level will cause a more-gentle clipping effect. Note that in this embodiment, the harshness of clipping is discretely controlled. Hence, threshold and harshness are separate adjustments, which do not rely on each other, unlike the embodiment of FIG. 17.

The resultant harshness-adjusted clipping signal 1769 is provided to the MOSFET power amplifier circuit 1771. In this embodiment, the MOSFET is a model FDH44N50 available from Fairchild Semiconductor Corporation. It has a maximum voltage handling of approximately 500 volts and a maximum power dissipation of 750 watts. This MOSFET is exemplary, and other models and types can be employed in alternate embodiments. Likewise, alternate forms of power-handling circuits can be employed instead of the illustrative MOSFET in alternate embodiments.

As depicted, the alternator coil delivers a rectified voltage to the MOSFET circuit 1771 in the form of a variable load that is modulated by the signal from the harshness-adjusted clipping signal 1769. The MOSFET 1771 dissipates the power as appropriate. In addition, this embodiment provides a high-power resistor R10 in line with the MOSFET 1771 so as to further assist in power dissipation. In an embodiment, the resistor is rated at 10 ohms, 225 W. The current waveform 1773 represents the variable load that is driven by the harshness-adjusted voltage (1769).

A circuit 1780 is provided at the output of the rectifier 1703. A current sense resistor RS1 is provided along the lead 1781, with each end of the resistor applied to a subtracting adder 1782 to measure the instantaneous current drawn from the alternator into this load system. This instantaneous current is multiplied (multiplier 1784) by the known resistance in the alternator coil to provide the voltage drop which occurs inside the alternator. As will be described below, this voltage loss is then added (adder 1786) to the measured voltage entering the low pass filter (2110 described below in FIG. 21) of the dynamic load circuit (2100) to provide the correct voltage that was induced in the alternator. This design is utilized in both the dynamic load circuit of FIG. 21 and the clippers of FIG. 17 and FIG. 17A to permit them to operate on the actual induced voltage in the alternator. The induced voltage more accurately represents the piston velocity and piston stroke than the measured voltage.

Note that by setting the resistances and clipping levels appropriately for either clipping circuit above, the clipper system acts as a small dissipater of power on a continuous basis. In other words, if the maximum peak voltage is 250, the clip can be set to occur at 249, causing a continuous clipping effect, and therefore provide for nearly instantaneous return of power if the engine falters as the dissipated power is now immediately available.

In addition, the clipping circuit can be set up as a switching circuit so that it functions at full engine speed and does not dissipate the absorbed power, but stores it or transfers it in an efficient and useful form to a storage battery or other power storage component. An arrangement for a switching circuit that is applicable to the clipper in this capacity is described below with reference to FIG. 22.

It is contemplated that the clipper circuit of FIG. 17A can include various indicators and meters as appropriate, such meters and indicators can be implemented by well-known techniques and in accordance with the arrangements set forth in FIG. 17 described above.

As will be described further below, in alternate embodiments, a MOSFET is employed as a variable load that can be varied to extract power over the entire cycle, as contrasted with the clipper circuit that removes power from the cycle only when the voltage exceeds a specified value. This approach may provide for more-uniform and effective power extraction and load control than the clipper circuit in certain implementations, thereby reducing the electrical losses and reducing the stress on the alternator coil, and its attachment to the spring. Dynamic control that occurs over the entire cycle is described in further detail below.

J. Alternate Intake-Heating Arrangements

Figure 18:
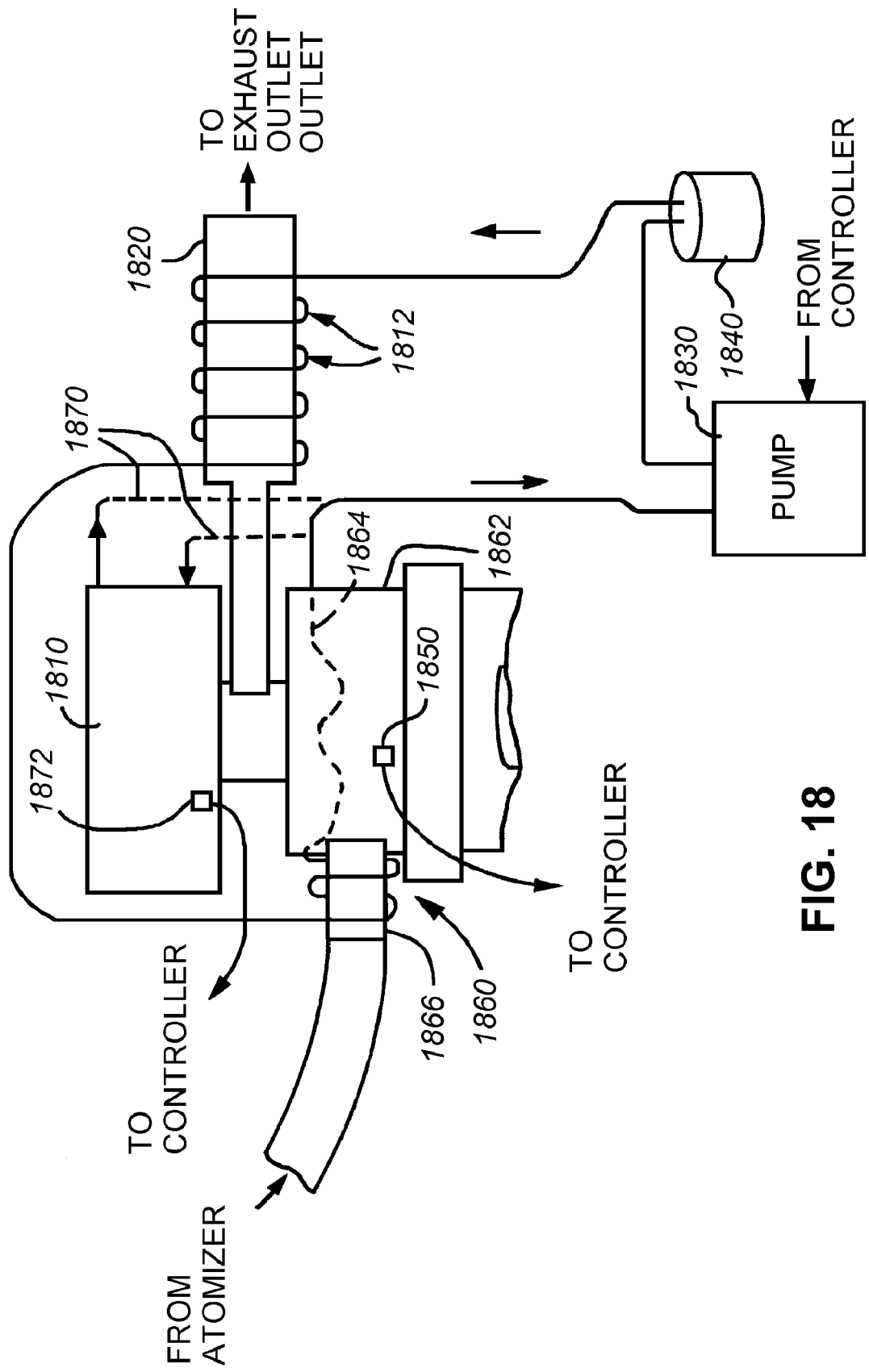
FIG. 18 is a somewhat schematic diagram of a heated-fluid exhaust jacket inlet heating arrangement according to an illustrative embodiment.

As discussed above, variety of heat-exchange and intake-heating arrangements are contemplated. FIG. 18 details a further intake heating arrangement that can be used discretely or in conjunction with the MICE generator cooling head 1810. Because the vaporization of fuel air mixture benefits from a warm intake chamber, it is contemplated that further intake heat can be obtained from applying a fluid jacket and/or coil 1812 to the exhaust outlet/muffler 1820. In a basic arrangement, the fluid is transported by an electric pump 1830 through the jacket/coil 1812 via a reservoir 1840. The speed and operation of the pump is controlled the controller based upon prevailing inlet temperature. This temperature is derived from a temperature sensor 1850 located within the inlet flow. A heat exchanger (not shown in FIG. 18) can be provided to remove excess heat when desired. The size and shape of the exhaust coil and jacket is selected to allow sufficient heat to be presented to the inlet area 1860 during steady state operation. The inlet area is wrapped in sufficient lengths of fluid tubing to transfer the needed amount of heat. Note that both the intake plenum 1862 (see dashed line tubing 1864) and inlet port area 1866 (and lead tube/atomizer outlet) can be heated to achieve the desired inlet temperature.

The cooling head 1810 can also be interconnected to the fluid flow as indicated by the dashed lead lines 1870. The head 1810 can provide additional heat to the inlet as described above, and is thereby cooled when needed to maintain the appropriate temperature level for proper cylinder-to-piston fit. Valves and heat exchangers can be interposed between the head leads 1870 and the flow to ensure that the inlet is not excessively heated. A temperature sensor 1872 within the region of the head 1810 determines the appropriate level of flow therethrough.

Figure 18A:
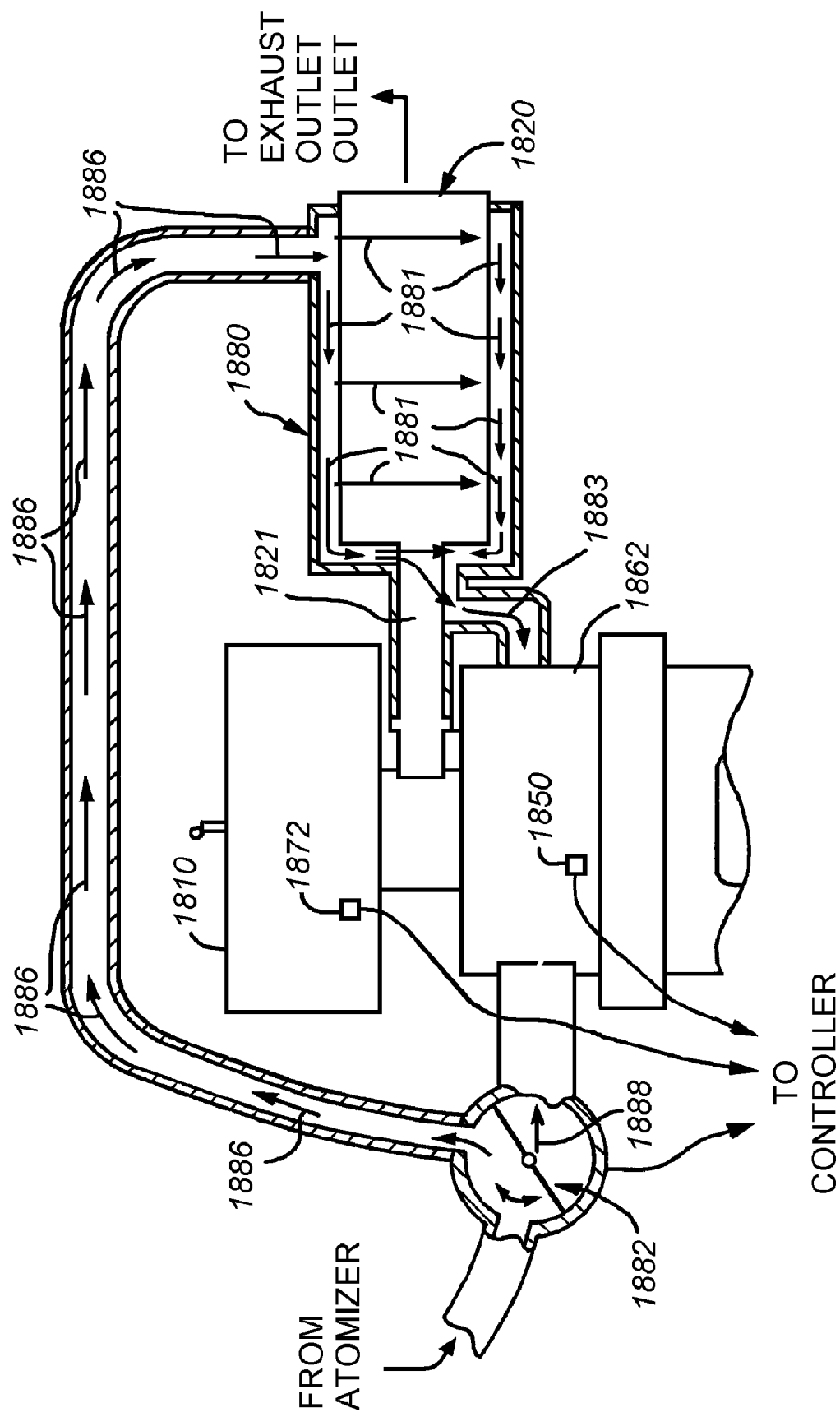
FIG. 18A is a somewhat schematic diagram of a heated-intake-air exhaust jacket inlet heating arrangement according to an alternate embodiment.

In an alternate embodiment, shown in FIG. 18A, heat can be transferred directly from the exhaust to the inlet air mixture by placing a sheath 1880 (shown in cross section) over the exhaust muffler 1820 and/or exhaust line 1821 through which all, or a portion, of the inlet air mixture flows (arrows 1881) before entering the inlet plenum 1862 (arrow 1883). A valve 1882 controls the relative fraction of inlet air that flows over the exhaust components (arrows 1886), and is heated thereby, and the fraction that flows (arrow 1888) directly to the inlet plenum to mix with the heated air. The pressure differential to drive the inlet air flow can be provided by the natural aspiration of the two-stroke engine, or alternately by a separate blower or fan (not shown). The valve 1882 can be actuated electrically, using a servo, stepper motor or similar mechanism in communication with the controller and responding to the temperature sensor 1850 or another parameter, such as power output from the alternator.

K. Alternate Piston Spring Assembly

Figure 19:
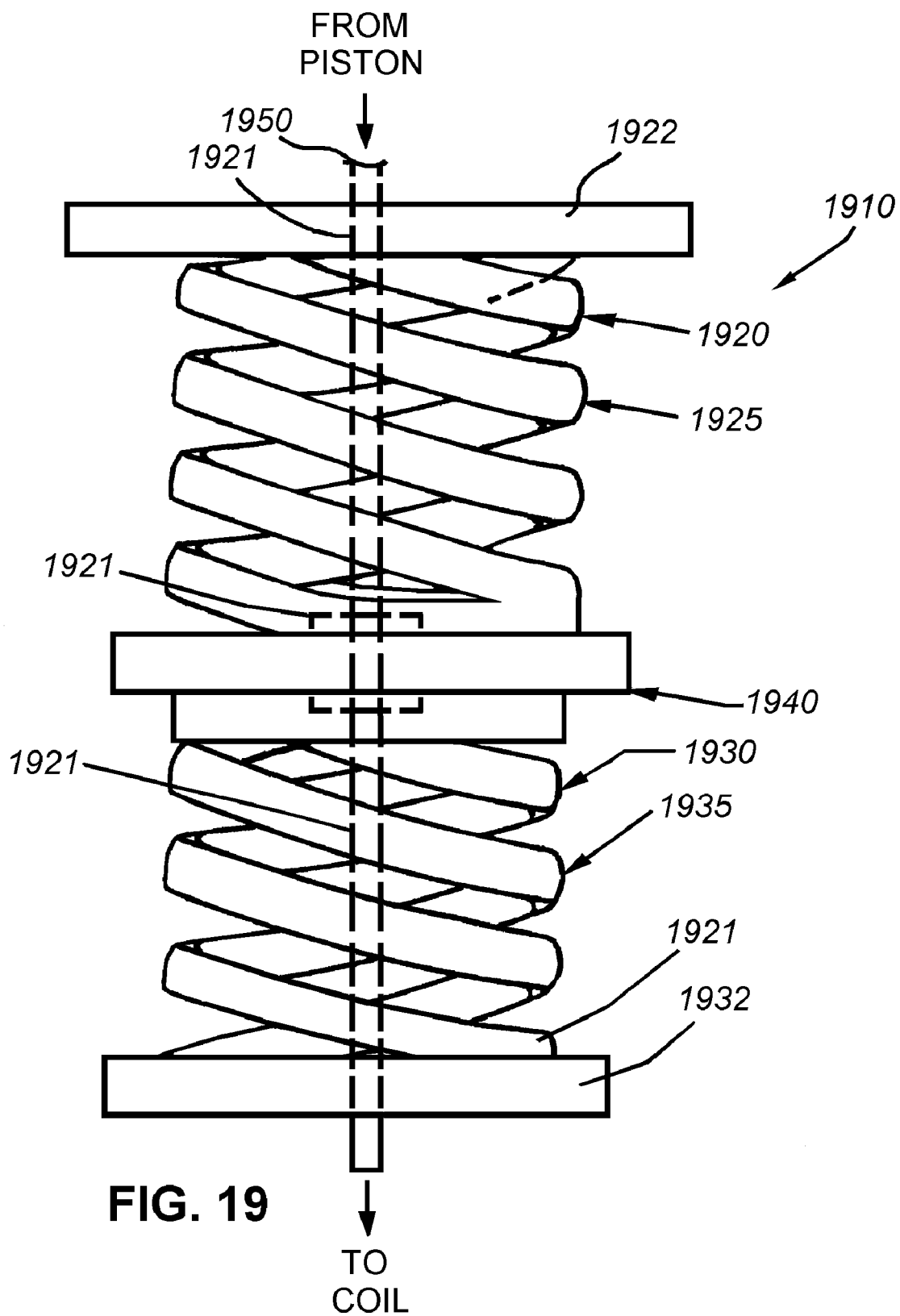
FIG. 19 is a side view of a spring assembly having two stacked, concentric springs according to an alternate embodiment.

The basic design of a piston spring detailed in FIGS. 2 and 3 is adapted to compress and expand from rest between each of the bottommost and topmost stroke positions respectively. As such, the spring is designed to undergo both tension and compression which requires in turn that the spring ends be integral with the end plates. Given the high degree of cyclically applied force experienced by the spring and the stress concentrations resulting from the integral structure, a spring that undergoes only tension or compression exclusively, and is physically separate from the end plate structure, is desirable. FIG. 19 details a quad spring assembly 1910 that can be mounted in a spring casing similar to the casting 270 described for FIG. 2 above. The spring assembly 1910 consists of four similar single-helix springs with a simple coil design, 1920, 1925, 1930, and 1935, provided in line and concentrically with each other. In essence each spring in a respective spring pair 1920, 1925 and 1930, 1935 is intermingled with the other spring in the pair to achieve the equivalent geometry of a double helix arrangement. The springs can be constructed using circular-cross section wire stock in this embodiment.

The springs 1920, 1925, 1930, 1935 each have two opposing free ends 1921 (as opposed to one free and one fixed end as provided in the spring 286 of FIGS. 2-3 above), which are secured to a central base 1940 and a pair of opposing end plates 1922 and 1932 using recessed pockets in the central and end plates, or by other means. The pockets permit a rocking or rolling motion of the spring ends 1921. The end plates 1922 an 1932 are attached to the spring casing (not shown in FIG. 19). The springs each bear upon a central base 1940 in a manner so as not to impart a bending force to the plate that causes the plate to tilt relative to the piston axis. The central plate 1940 is fixed to the piston shaft 1950. The bottom end of the piston shaft is operatively connected with a moving alternator coil assembly (not shown in FIG. 19) similar in construction to the coil 294 described for FIG. 2. The coil differs in that it moves under action of the shaft without connection to the bottom end of the spring itself.

The illustrated arrangement of four stacked, fixed springs 1920, 1925, 1930 and 1935 with a floating base 1940 therebetween enables the lower spring 1930 to compress on the downstroke while the upper spring 1920 relaxes but remains in contact with the central base (leaving the upper spring under slight compression at the end of the stroke). Likewise, the piston upstroke causes the upper spring 1920 to compress while the lower spring almost fully uncompresses while remaining in contact with the base 1940. Hence, this arrangement allows each spring 1920 and 1930 to act mainly in compression, lessening the cyclic load that each spring must endure. This also allows inexpensive, simple coil springs to be used in place of an expensive machined multiple helix spring with integral ends.

The cross sectional dimension of the helix, spring material and overall diameter are each highly variable. These parameters should be selected to provide an acceptable safety factor against fatigue failure and to ensure sufficient applied force against the piston stroke. It is expressly contemplated that the springs can be dissimilar in length, diameter and/or helix-cross section in alternate embodiments. Likewise, the arrangement of stacked, concentric springs as shown in FIG. 19 can be substituted with another acceptable arrangement, such as two or more nested springs. To this end, it is contemplated that any of the spring arrangements shown herein including a combined compression and tension spring like that of FIG. 2 can include two or more nested springs each applying a force through some or all of the piston stroke. Such an arrangement can be used to provide a stronger resistance force in the event of overstroking, for example.

L. Deployment of an Exemplary MICE Generator-Based Generating System

Figure 20:
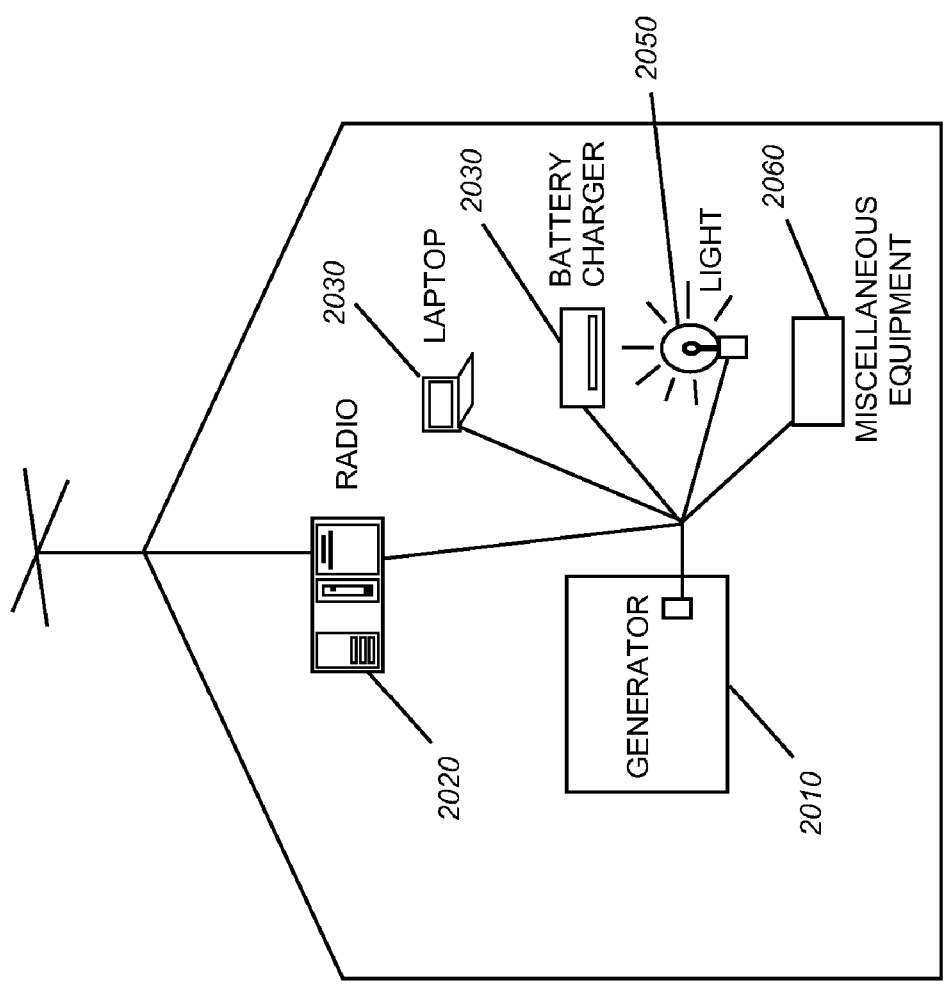
FIG. 20 is a schematic diagram of a plurality of exemplary applications for the generating systems according to the various embodiments contemplated herein.

FIG. 20 details a schematic representation of exemplary applications for a MICE-based generator 2010 having the rated power output contemplated herein. Not all components shown are necessarily connected concurrently, or in concurrent use due to output limitations. Nevertheless, it is contemplated that radio equipment 2020, computers 2030, external battery chargers 2040, interior and exterior lights 2050 can all be interconnected with, and operated by, the generating system 2010. Other types of equipment 2060 can also be interconnected including, but not limited to, electric heaters, night vision scopes, global positioning and navigation devices, signaling devices, refrigerated coolers and other appliances operating at less than or equal to the rated generator output. Using a 1.5 liter fuel tank, the generating system is estimates to provide rated power demands for more than four hours.

M. Dynamic Control of the Piston Stroke

It should be understood that the above-described circuits (FIGS. 17 and 17A) afford a high degree of safety and reliability against overstroking of the piston, which would potentially damage or destroy the MICE generator under many circumstances. However, the clipper is designed to operate specifically in response to an overstroke condition, and reduces this condition through the dissipation of energy at the peaks that exceed a desired threshold. Improved efficiency and smoother operating performance can be achieved by applying so-called dynamic controls to the MICE operation. In this manner, the control circuit extracts power from the system to control piston stroke in at appropriate, dynamically variable levels over the entire piston cycle. Moreover, energy extracted by dynamic control is stored, rather than dissipated to improve efficiency. This stored energy can be placed into an appropriate repository, such as a large capacitor or battery and made available to the engine in low-voltage situations. Excess energy can also be dissipated by the slow charging of a battery (or other storage device) for start-up and backup functions. Note that the clipper circuit is still retained in most embodiments, as it affords an additional safeguard against operation that could damage the MICE, particularly in the event of failure of any dynamic control circuits.

1. Dynamic Load Control Through Feedback Circuits

As will be described, an integrator is used in the feedback loop that provides dynamic control. The feedback loop includes two components of a well-known Proportional-Integral-Derivative controller (PID), namely the proportional controller and the integral controller (integrator). This feedback loop addresses errors in alternator coil output quickly, and in particular, is driven by an error signal that is provided dynamically from the alternator coil output.

Figure 21:
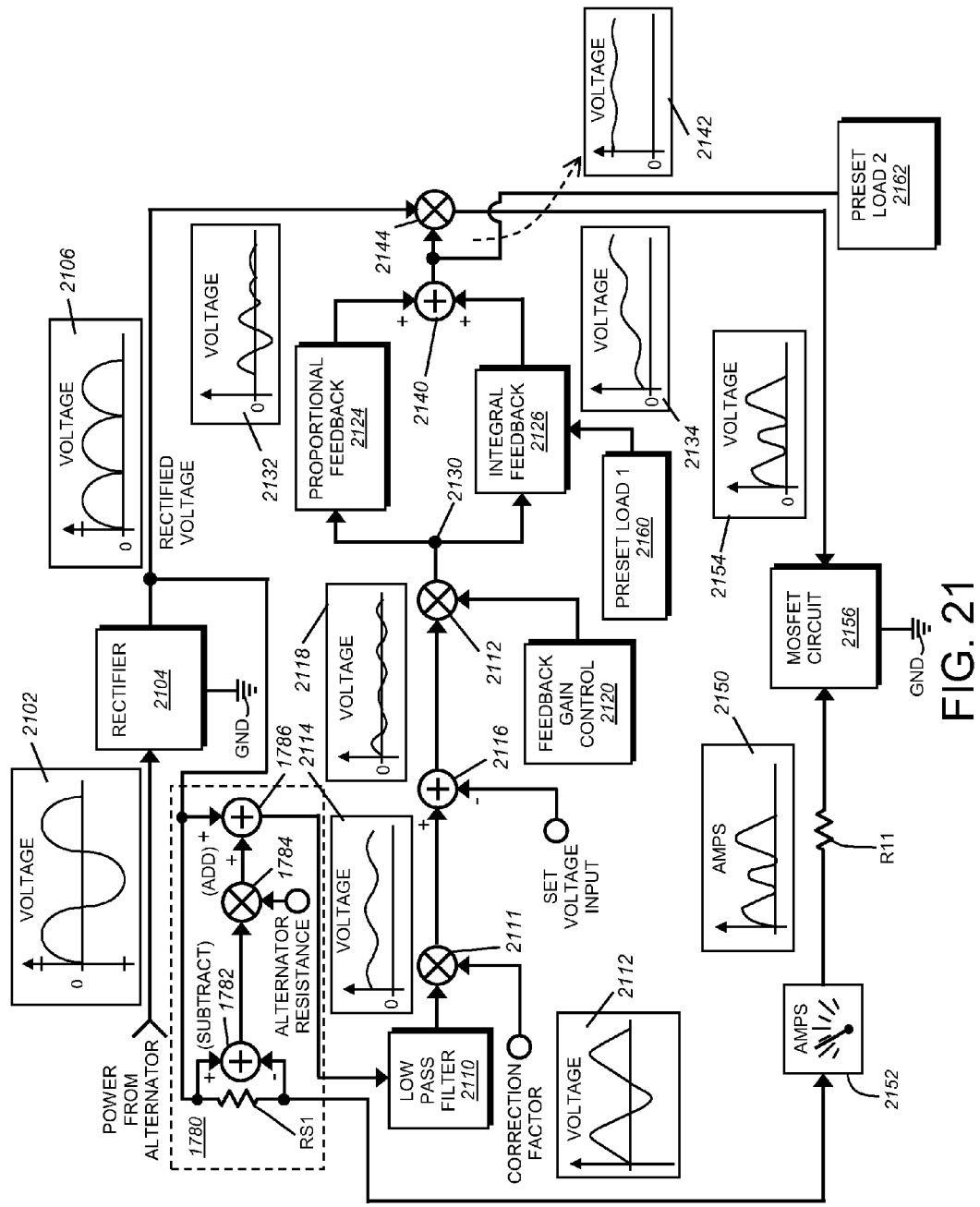
FIG. 21 is a block diagram of a power control circuit that applies a dynamic load to the MICE alternator coil throughout its operating cycle.
Figure 25:
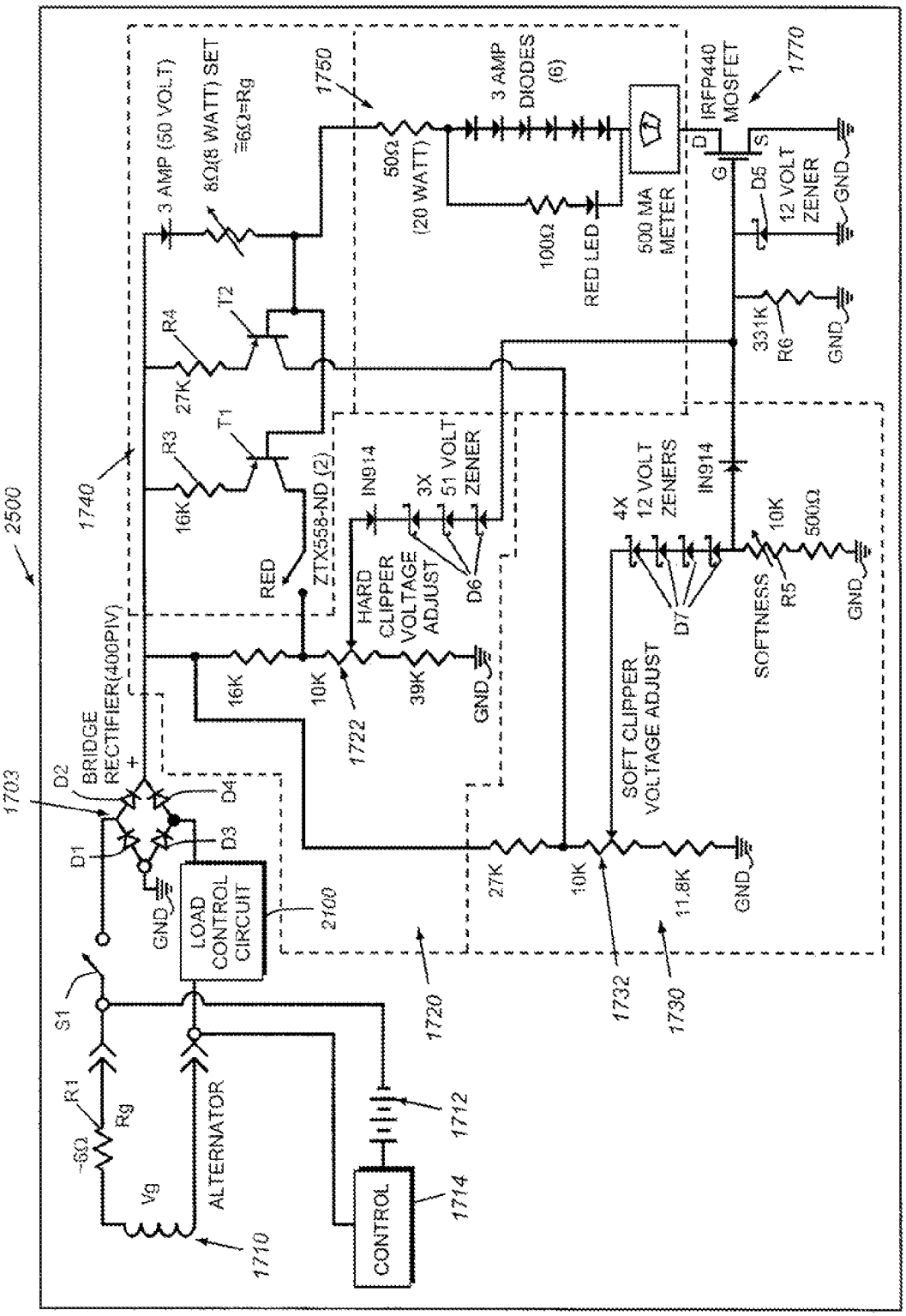
FIG. 25 is a schematic circuit diagram of a dual clipper circuit operatively connected with the MICE generator electrical output for regulating overstroking and load according to FIG. 17, including a dynamic load control circuit as shown in FIG. 21, in accordance with an illustrative embodiment.

Referring now to FIG. 21, a block diagram detailing a dynamic load circuit 2100 is shown. Additionally, the load circuit 2100 can be implemented into the circuit 1700, as shown in circuit 2500 of FIG. 25. The alternator coil input, represented by waveform 2102 consists of a standard voltage signal ranging from −250 to +250 volts (or a reduced value as required by the circuit). The signal 2102 is rectified by a full wave rectifier 2104 into a rectified waveform 2106. The rectified signal is directed through a connection 2108 to a low pass filter 2110. The low pass filter 2110 outputs to a multiplier 2111 that applies a correction factor 2112 to the signal. The correction factor 2112 converts the measured average of the rectified voltage to the implied peak voltage in waveform 2108. The correction factor is multiplied with the output of the filter 2110 to produce the voltage 2114. The average voltage, with the correction factor, is a reasonable estimate of the peak voltage. This technique is employed because the clipper can reduce the peak voltage without otherwise changing the shape of the waveform. Hence, direct measurement of the peak voltage may not be accurate. The average voltage provides an estimate of the implied peak voltage so as to permit the feedback loop to function accurately on the coil's output voltage waveform 2102 despite the fact that peaks are removed by the clipper circuit.

The average voltage is subtracted by the adder circuit 2116 threshold voltage (−245 volts in this example) to produce a waveform 2118 that is centered around 0 volts. Note these voltage values are actually divided-down for the purposes of the circuit implementation. This output waveform 2118 constitutes the error voltage, and is amplified using a multiplier 2122 based upon an input feedback gain control value 2120. This control can be applied by a potentiometer or other variable device. It changes the amplitude of the waveform 2118 before it is acted upon by the proportional feedback controller 2124 and the integral feedback controller 2126.

The resulting gain-adjusted signal is split at the connection 2130 and passed through the proportional feedback controller 2124 and the integral feedback controller 2126 proportional feedback controller produces a waveform 2132 that responds rapidly to changes and is centered around 0 volts. The integral feedback controller, conversely, maintains a relatively steady level at a non-zero voltage, representing a load necessary to keep the MICE running at a predetermined constant rate. Thus, assuming there is no other load on the MICE, the integrator 2126 ensures constant running conditions. The two signals are a combined by the adder 2140. That output is defined by the waveform 2142. It constitutes the "feedback voltage." The feedback voltage is passed to a multiplier 2144, which connects to the input voltage from the rectified alternator current (2106). In this manner, the feedback signal, which represents the applied load, is multiplied by the actual instantaneous voltage (which varies as shown), and represents the desired instantaneous current. The current is then proportional to the voltage as if the load was a passive resistor which varies slowly, as needed. This is shown by the tap and current waveform 2150, which can be interconnected with an ammeter 2152 that indicates instantaneous current. As noted above, the input voltage (2106) is attenuated by a divider or other device (not shown) to prevent damage to circuit components. The variable instantaneous current produced at the multiplier 2144 acts like a variable resistive load. The multiplier signal (voltage waveform 2154) is provided to a MOSFET circuit 2156 that receives an input from the alternator via a power resistor R11. In one embodiment R11 can be a 50-ohm, 225 W resistor (or 2×25-ohm resistors). The MOSFET can be another FDH44N50 chip or another type of power circuit. As will be described below with reference to FIG. 23, the stability and reliability of the MOSFET is enhanced by use further stabilizing circuitry.

As described above in connection with the clipper circuit 1751 of FIG. 17A, the above-described circuit 1780 is provided at the input of the low pass filter 2110 to provide the correct voltage that was induced in the alternator. This design permits the dynamic load control circuit 2100 to operate on the actual induced voltage in the alternator. As discussed above (and below, with reference to monitoring the engine), the induced voltage more accurately represents the piston velocity and piston stroke than the measured voltage.

A differentiator has been omitted in this, otherwise, largely traditional implementation of a PID controller described above. The differentiator applies dampening effects that may not be required in this implementation. There are preexisting mechanical dampening components that provide appropriate system dampening.

2. Preset Load

In general, it is desirable to permit a chosen load on the MICE alternator coil to be provided immediately upon switch-over from the starter. At startup, use of the integrator 2126 is less desirable, as it tends to respond slowly to voltage changes, and during the startup phase, quick changes are highly desirable. Once steady state runtime is attained, the integrator 2126 can be allowed to operate independently. The integrator 2126 is held at a preset load level.

Referring to FIG. 21, a preset load level 2160 is injected into the integrator 2126 to force it to output the needed level of load from the star so as to maintain proper load levels on the alternator coil. This preset load level cannot be reduced until it is released by the circuit. However, the preset load is designed as a minimum load for proper operation. If, at any time (even while preset load is applied) the MICE requires greater load, the circuit is configured so that the error signal can still increase integrator feedback output above the preset load level as needed to maintain proper load control on the MICE. A second preset load 2162 is at the output of the adder 2140. This serves to maintain the proportional feedback at the minimum chosen load level, though the proportional feedback can also increase the load above the preset value, and the proportional feedback subsequently increase or decrease as needed when released after startup has completed and the MICE is running stably. The integrator can also slide down to new values relatively quickly when released. The preset loads 2160 and 2162 are controlled by a timer or other sensing device that determines when the engine has completed its startup and is running stably. This time can be as little as 50-70 milliseconds. The preset load may be adjusted in stages after this point, or released entirely.

3. Switching Power Supply and Electrical Power Extraction

Figure 22:
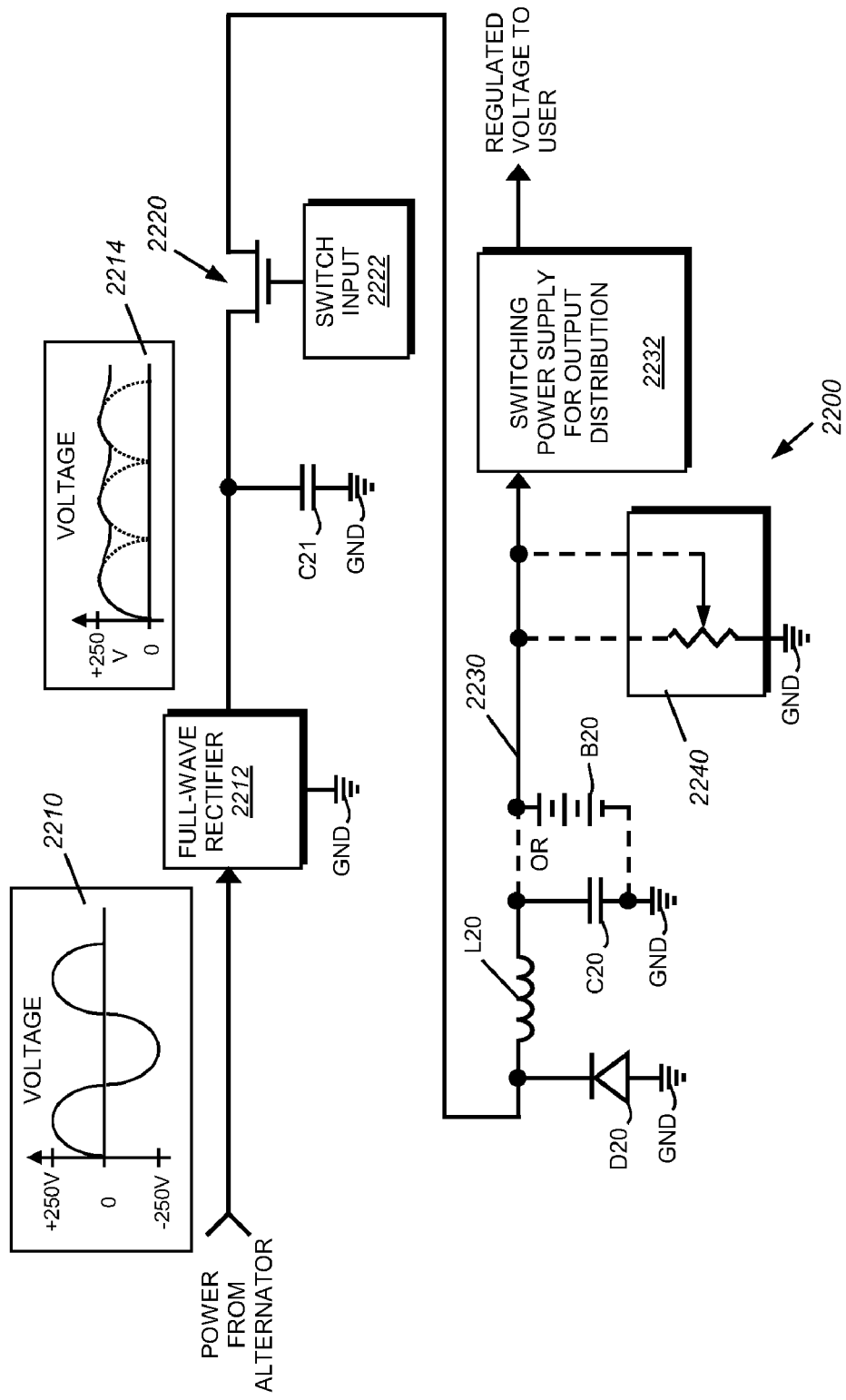
FIG. 22 is a block diagram of a switching power supply implementation of a dynamic control circuit including various power-extraction components for storing excess power generated by engine fluctuations.

The feedback arrangement contemplated herein can be provided in a power circuit that provides the extraction and use of electrical power rather than dissipation. In the contemplated implementation, engine control is the first priority of this circuit, and power-saving is a secondary, but desirable, outcome. It is contemplated that the circuit is used in conjunction with the clipper circuit to safeguard operation. Referring now to FIG. 22, a switching power circuit 2200 for providing variable load (under control of the circuit 2100) through power extraction and storage in the MICE is shown. Power (sinusoidal waveform 2210) is provided from the alternator to a full-wave rectifier 2212 (as shown in the waveform 2214). A MOSFET 2220 is connected to the rectified power. The MOSFET 2220 is switched when needed to apply further load from the alternator coil. When switched by a switching input 2222, power is drawn into the inductor loop defined by the diode D20, inductor L20 and low-loss capacitor C20 (or another suitable power storage device, such as an ultra capacitor or battery B20 (shown in phantom). The power continues to draw after the MOSFET is switched off, ensuring a gradual transition in load. A capacitor C21 is provided between the rectifier 2212 and the MOSFET 2220 to smooth the current drawn from the alternator and to provide the short current bursts required by the MOSFET circuit. This is evidenced by the waveform 2214.

As discussed above, rather than controlling power through dissipation, greater efficiencies may be attained by allowing power to be drawn into a storage device such as a battery or capacitor that can be used to supply power during low-voltage events in the coil. The storage capacitor/component C20 (B20) is connected (via lead 2230) to a second switched power supply arrangement 2232 that provides regulated DC voltage at the desired level. This supply can have a structure that is essentially similar to that shown in FIG. 22. The storage component C20 (B20) serves to buffer the regulated output power from fluctuations in MICE output, absorbing those fluctuations while simultaneously regulating engine operation. In the process, the circuit saves power that would otherwise be wasted since the user, in all likelihood, would not be drawing power in exactly the same manner as the fluctuating engine provides power. This energy storage circuit also allows the overall size of the engine to be reduced because short term engine dropout have less influence. This arrangement also permits slower control of the engine throttle since sudden increases or decreases in required power are slowed by the storage element C20 (B20). It is contemplated that the circuit can include a dissipative element 2240 in line with the storage element C20 (B20) that prevents overcharging, using known design techniques that are depicted as a variable resistor.

Alternatively, the storage capacitor C20 can be reduced in size to provide minimal storage and the dissipative element can be employed in the above circuit to dissipate greater amounts of power so as to provide the required load on the alternator coil. In a further design, the capacitor C20 can be sized smaller so that it exists mainly to avoid spiking (but not to absorb all excess power), and some amount of excess power is always dissipated. The routinely dissipated power is then available to fill a sudden need for an increase in power output. Where a dissipative element is employed in either the clipping or dynamic control circuitry) is can include a slow charging circuit and storage battery (such as the system storage battery 1486). In this manner power is "dissipated" to a useable source for starting and/or battery back-up operation when the engine is deactivated.

4. MOSFET Circuit Design Details

The implementation of a MOSFET power absorber in the linear range, as generally contemplated herein often entails careful design to maintain stability of the system, and thereby prevent oscillation within the MOSFET. In the above-described embodiments, the MOSFET operating in the linear region use a rapid feedback on the gate voltage and obtains feedback voltage representing the MOSFET current using a low-value resistor between the MOSFET and ground.

Figure 23:
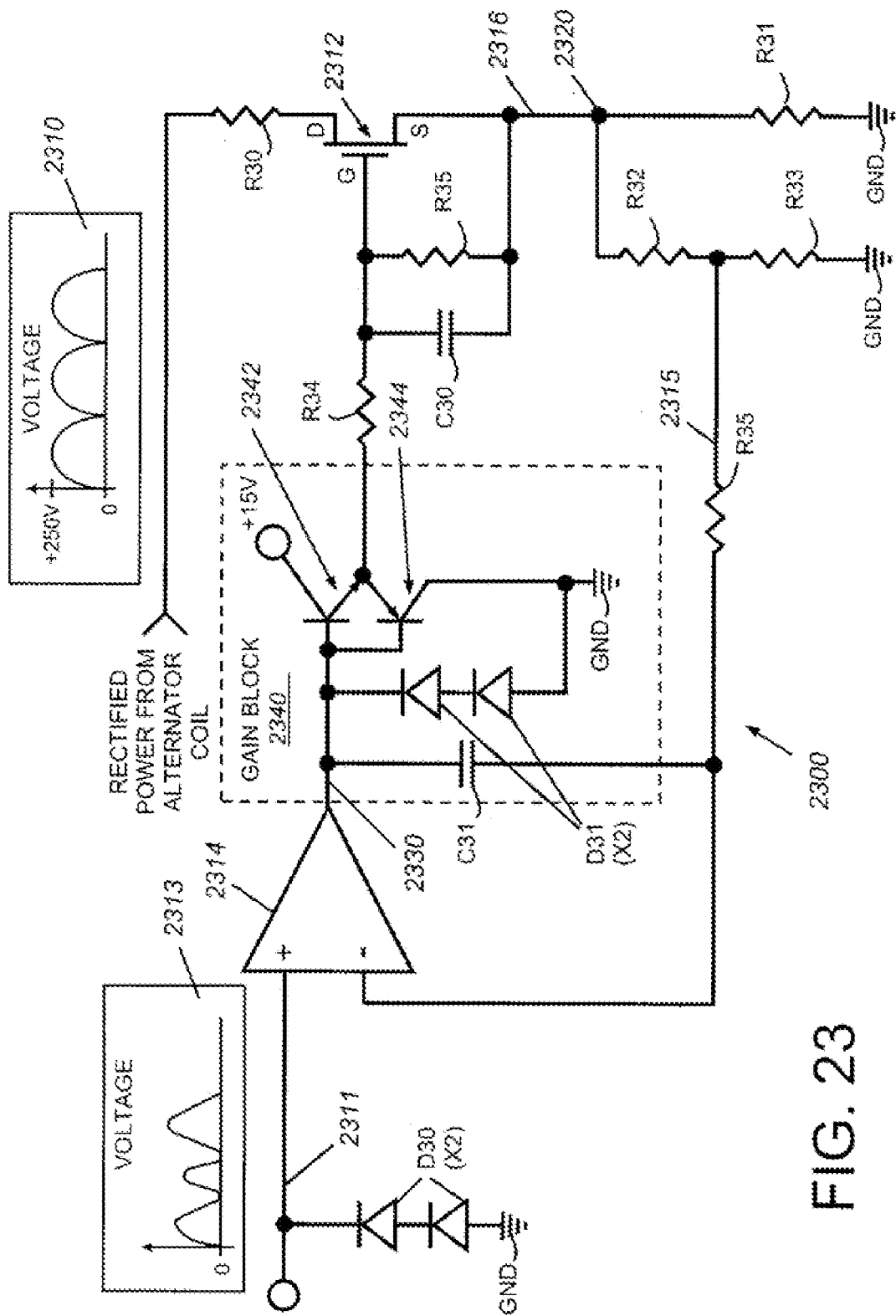
FIG. 23 is a block diagram of a stabilized MOSFET circuit for use in the dynamic load control circuit implementation according to illustrative embodiments of this invention.

Referring now to FIG. 23, the MOSFET power-absorption circuit 2300 according to an embodiment is shown in further detail. The circuit 2300 receives rectified power from the alternator coil (waveform 2310), which is passed to the MOSFET 2312 through a dissipative resistor R30. The resistor R30 is a high-power-handling resistor rated between 25 and 100 ohms in this embodiment. The other side of the MOSFET 2312 is connected to ground (GND) via a low-resistance sense resistor R31 in the range of approximately 0.5 to 1.5 ohms. In this embodiment, these values yield maximum MOSFET currents of 17 amps and 6 amps, respectively. The gate of the MOSFET is connected to an operational amplifier 2314 that receives one input (+) voltage which represents the current flow (waveform 2313) desired in the MOSFET. The second input (−) lead 2315 of the amplifier 2314 is connected via a series resistor and a voltage divider (R32 and R33) to the sense resistor lead 2316. Hence, the voltage on the second lead 2315 is driven up by the amplifier 2314 to match the voltage on the first lead. This drives the gate voltage on the MOSFET, and very rapidly controls the flow of current through the MOSFET to ground—using the feedback generated at second lead 2315 which is amplified by the amplifier 2314.

Stability of the circuit (oscillation prevention) is enhanced by reducing the feedback gain on the second lead 2315 using a resistive divider consisting of a grounded pair of resistors R32 and R33 (330 ohms and 100 ohms, respectively), between the sense resistor R31 and the feedback lead 2315. The values of the resistors are chosen so that the actual voltage received from the sense resistor R31 is reduced several times. In an exemplary embodiment the voltage reduction is approximately 4.3 times. In other words, the voltage received at the (−) input of the amplifier 2314 is 4.3 times less than the voltage at connection 2320 (i.e. R32/R33=¼.3).

In addition, stability is further enhanced by adding some conventional stabilizing elements including a 5-10 ohm resistor R34 in series with the MOSFET gate, along with a bridging capacitor C30 of appropriate value and a resistor R35 (220 ohms in this example) between the gate and the lead 2316. This bridge serves to desirably increase the gate-to-source capacitance. Additionally, to prevent a negative bias to the circuit, a pair of diodes D30 (Fairchild type IN914 in this example) are provided between the input lead 2311 and ground (GND). Likewise, to stabilize the feedback loop along the second lead 2315, a capacitor C31 of appropriate value is provided between the lead 2315 and amplifier output 2330.

To compensate for internal resistance within the amplifier 2314, a gain block circuit 2340 is provided between the amplifier output and the resistor R34 along the MOSFET gate lead. The gain block consists of a pair of transistors 2342 (a Fairchild NPN type 2N5088 in this example) and 2344 (a Fairchild PNP type 2N3906 in this example) as shown tied between +15 volts and ground (GND). The base of each transistor 2342, 2344 is tied to the amplifier output 2330 as shown, while the emitter of transistor 2342 and collector of transistor 2344 are each tied to the gate lead. The gain block serves to increase the current drive to the MOSFET gate. In particular, the exemplary arrangement provides for quite harsh drive of the MOSFET gate, ensuring a rapid response. Any acceptable arrangement for a gain block can be employed according to an alternate embodiment. Between the amplifier output 2330 and the transistors 2342, 2344 there is also provided a diode circuit D31 tied between the output lead 2330 and ground (GND).

5. Monitoring of MICE Performance

Figure 24:
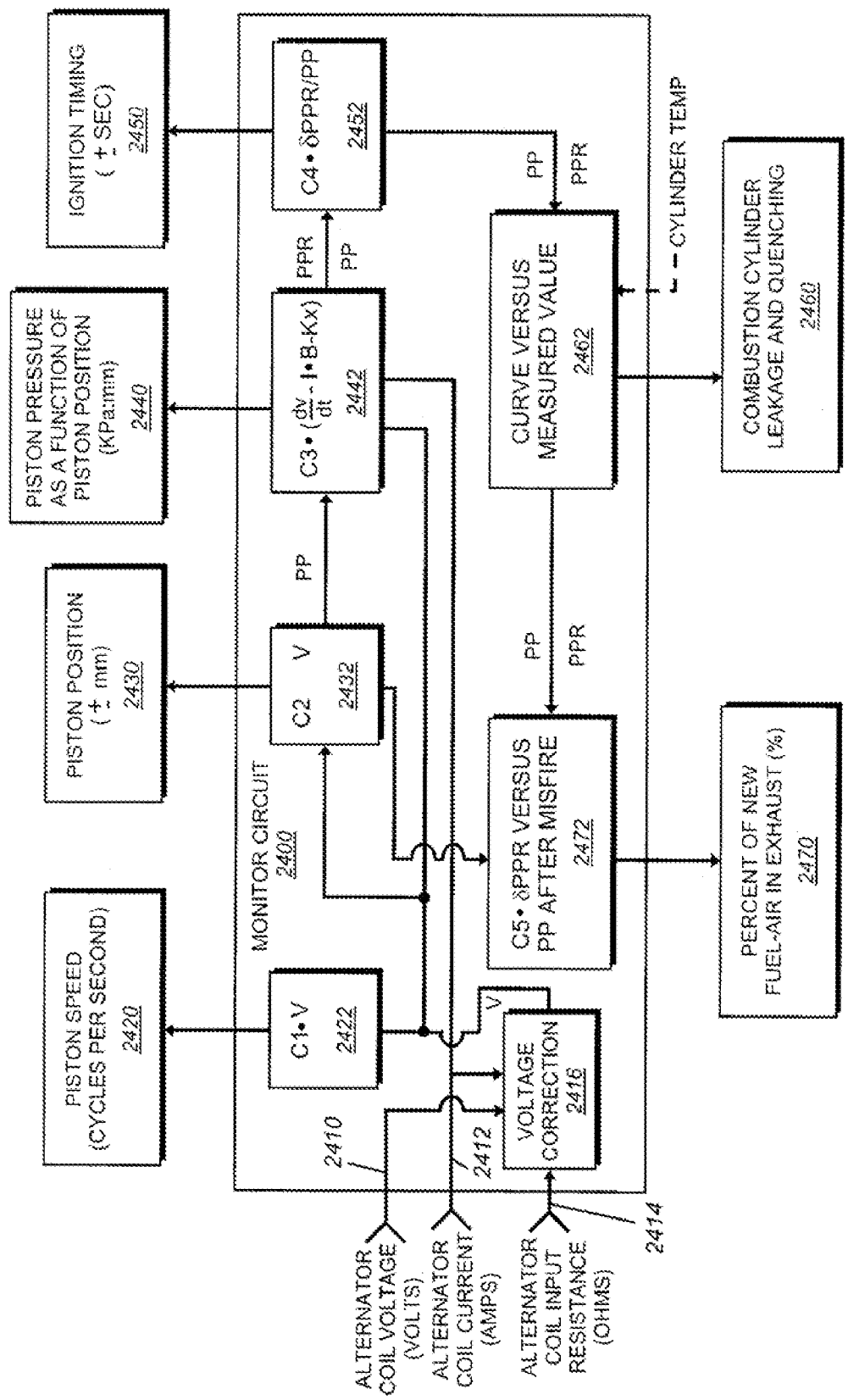
FIG. 24 is a block diagram of an engine performance monitoring circuit providing a plurality of predetermined performance data based upon measured values for alternator coil voltage, current and resistance.

By carefully monitoring the voltage, current and input resistance of the alternator coil, using known electrical measuring techniques and components, a variety of engine performance characteristics can be derived based upon the known mechanical and electrical characteristics of the alternator coil. With reference to FIG. 24 a block diagram of a monitoring circuit 2400 is shown. This circuit can be implemented as a plurality of separate analog or digital processors or as a unified processor that receives the depicted inputs from the alternator coil, namely the instantaneous coil voltage 2410, the instantaneous coil current 2412 and the coil resistance. The input resistance is used, generally, as described above to correct (operator 2416) the measured engine voltage to provide the actual alternator velocity-induced voltage V. This voltage V more-accurately represents piston speed and stroke, when corrected by the voltage value equal to the instantaneous alternator current times the DC resistance of the alternator. Each of the required values (voltage, current, resistance) can be measured using conventional measuring devices that provide the value in an appropriate format to the circuit 2400.

The piston speed (in cycles per second) 2420 is derived, and optionally displayed, based upon an operator 2422 that multiplies the present coil voltage (V) by a predetermined constant C1, determined based upon experimental and/or expected voltage output at a given piston speed. The constant C1 may vary depending upon the voltage according to a predetermined curve.

The piston position (in millimeters, etc. relative to a fixed cylinder position) 2430 is derived (and optionally displayed) by an operator 2432 that computes the integral of voltage V and multiplies it by an appropriate constant C2.

The piston pressure as a function of piston position (PP) 2440 is derived (and optionally displayed) by an operator 2442 that differentiates the voltage V to obtain acceleration, multiplies by the mass of the piston and coil to derive force, subtracts the current I times the coil magnetic field B and a constant which gives force. This value is multiplied by an appropriate geometric constant C3 to obtain piston pressure.

The ignition timing (dwell in seconds) 2450 is calculated by differentiating the piston pressure PPR to identify pressure jumps and then relating the jumps to piston position (PP) using the operator 2452. This value is multiplied by an appropriate constant C4.

Combustion cylinder leakage and excessive loss of engine heat on the expansion cycle 2460 (also termed quenching—which can lead to a reduction of performance due to undesired drops in temperature) is calculated based upon the degree of non-adiabatic compression and expansion. The calculated values for piston position (PP) and piston pressure (PPR) are compared by the operator 2462 to a predetermined graph (or look-up table) of pressure versus position that is stored or calculated for a known operating temperature to determine whether the measured values are following a non-adiabatic curve. An optional temperature input from the engine cylinder can be provided to establish the appropriate curve.

The percentage of new fuel air in the exhaust 2470 can be determined by detecting an increase in piston pressure on the power stroke following a misfire cycle. A misfire can be read by sensing the voltage from a previous cycle, which will deviate from the desired value. The piston position PP is read by the operator as well as the piston pressure PPR. The change in piston pressure at the appropriate piston position multiplied by the appropriate constant C5 produces the percentage increase in fuel-air.

It should be clear that the data derived from the monitor circuit not only provide the user and manufacturer with diagnostic and performance date, but can be used in conjunction with a microprocessor or other control circuit that provides control inputs to the electrical and mechanical systems of the MICE based upon the current operating performance of the engine. Many of the above-described control systems (manifold heating, fuel-air delivery/heating, starter components, etc.) can be controlled based upon one or more of the derived performance characteristics.

It should be clear that the generating system of this invention offers a reliable, relatively efficient and highly portable solution to field electric requirements. It maintains a highly stabile operation, through the above-described control circuitry. It runs efficiently and quietly on basic fuels, and requires little if any maintenance over a relatively long use life. With appropriate modifications, it is expressly contemplated that the rated power output can be scaled up or down to supply particular needs outside those described herein. Such needs can be as large as a base camp with a number of electrical devices or as small as an individual electrical appliance, tool or device.

The foregoing has been a detailed description of illustrative embodiments of the invention. Various modifications and additions can be made without departing from the spirit and scope thereof. For example, the type of fuel employed can be widely varies and alternate fuel sources including gaseous sources (at ambient temperatures and low-altitude pressures), biologically based fuels (e.g. biodiesel), and combinations thereof can be employed. Likewise, the materials employed for any aspect of the invention are highly variable and composites and/or polymers can be substituted where practical to reduce weight and/or increase durability. It should also be noted that various terms used herein, such as "top," "bottom," "upper," "lower," "radial," "axial," and the like, are meant to describe relative directions and are not intended to define absolute directions with respect to gravity of another reference system. Moreover, where method, process or procedure steps are provided, or more generally, where a control or operational function is described, it is expressly contemplated that such step or function can be implemented using electronic hardware, software that includes computer-readable medium comprising program instructions, or a combination of hardware and software. Accordingly, this description is meant to be taken only by way of example, and not to otherwise limit the scope of this invention.

What is claimed is:

1. A power generating system comprising:
   a miniature internal combustion engine (MICE) generator having a piston and shaft axially moving within a casing and the shaft being operatively connected to a first end of a spring a second end of the spring being fixed to the casing, the shaft being further interconnected to an alternator assembly in which axial movement of the shaft causes relative movement of an alternator coil with respect to a magnet assembly; and
   a dynamic load control that generates a control signal in response to a voltage waveform provided by a voltage output of the coil, the control signal varying throughout a cycle of the waveform and being operatively connected to a load-generating element that, in response to the signal, varies current provided by the coil and provides it to a power control circuit interconnected to at least one of a power-dissipating element and a power-storing element to thereby vary a load on the coil;
   wherein piston stroke is controlled at dynamically variable levels over the entire piston cycle.

2. The power generating system as set forth in claim 1 wherein the power control circuit comprises a MOSFET operatively interconnected with at least one of the power-storing element and the power-dissipating element.

3. The power generating system as set forth in claim 2 further comprising an amplifier that receives the signal and includes a feedback loop signal from a dissipative lead of the MOSFET an output of the amplifier being operatively connected to a gate of the MOSFET.

4. The power generating system as set forth in claim 3 further comprising a gain block operatively connected between the output of the amplifier and the gate of the MOSFET.

5. The power generating system as set forth in claim 1 wherein the power control circuit comprises a switching power supply operatively interconnected with at least one of the power-storing element and the power-dissipating element.

6. The power generating system as set forth in claim 1 wherein the power control circuit is interconnected to both the power-storing element and the power-dissipating element.

7. The power generating system as set forth in claim 1 wherein the power-dissipating element includes a chargeable storage battery used for startup of the MICE generator.

8. The power generating system as set forth in claim 1 wherein the control signal is generated based upon the coil voltage and current, and adapted to approximately continually provide power to the power-absorbing elements so that the coil current is proportional to the coil voltage throughout the power cycle and over-speed and under-speed events are suppressed.

9. A power generating system comprising:
   a miniature internal combustion engine (MICE) generator having a piston and shaft axially moving within a casing and the shaft being operatively connected to a first end of a spring a second end of the spring being fixed to the casing, the shaft being further interconnected to an alternator assembly in which axial movement of the shaft causes relative movement of an alternator coil with respect to a magnet assembly; and
   a dynamic load control that generates a control signal in response to a voltage waveform provided by a voltage output of the coil, the control signal varying throughout a cycle of the waveform and being operatively connected to a load-generating element that, in response to the signal, varies current provided by the coil and provides it to a power control circuit interconnected to at least one of a power-dissipating element and a power-storing element to thereby vary a load on the coil;
   wherein the control signal comprises a feedback signal provided by adding an output of proportional feedback component of a proportional-integral-derivative (PID) controller and an output of an integral feedback component the PID controller operatively connected to the voltage output of the coil.

10. The power generating system as set forth in claim 9 wherein the proportional feedback component and the integral feedback component each receive an input signal based upon voltage output by the coil.

11. The power generating system as set forth in claim 10 further comprising a rectifier and a low-pass filter operatively connected to the voltage output of the coil and a correction factor that is multiplied with an output of the low pass filter to represent a peak voltage.

12. A power generating system comprising:
   a miniature internal combustion engine (MICE) generator having a piston and shaft axially moving within a casing and the shaft being operatively connected to a first end of a spring a second end of the spring being fixed to the casing, the shaft being further interconnected to an alternator assembly in which axial movement of the shaft causes relative movement of an alternator coil with respect to a magnet assembly;
   a dynamic load control that generates a control signal in response to a voltage waveform provided by a voltage output of the coil, the control signal varying throughout a cycle of the waveform and being operatively connected to a load-generating element that, in response to the signal, varies current provided by the coil and provides it to a power control circuit interconnected to at least one of a power-dissipating element and a power-storing element to thereby vary a load on the coil; and
   a first preset load operatively connected to the integral feedback component that is applied during a startup of the MICE generator so as to cause the integral component to maintain a predetermined level.

13. The power generating system as set forth in claim 12 further comprising a second preset load operatively connected at an output of an adder that is interconnected with each of the proportional element and the integral element, the second preset load being applied during startup of the MICE generator so as to compensate for a signal of the output of the proportional component.

* * * * *

UNITED STATES PATENT AND TRADEMARK OFFICE
CERTIFICATE OF CORRECTION

PATENT NO. : 7,629,699 B2
APPLICATION NO. : 11/619969
DATED : December 8, 2009
INVENTOR(S) : Annen et al.

It is certified that error appears in the above-identified patent and that said Letters Patent is hereby corrected as shown below:

Column 1, lines 17-23, the "STATEMENT REGARDING FEDERALLY SUPPORTED RESEARCH OR DEVELOPMENT" and its following paragraph, should be deleted.

Signed and Sealed this

Eighth Day of June, 2010

David J. Kappos
*Director of the United States Patent and Trademark Office*